(12) United States Patent
Savatsky et al.

(10) Patent No.: US 12,202,917 B2
(45) Date of Patent: Jan. 21, 2025

(54) METHODS FOR IMPROVING GAS PHASE POLYMERIZATION

(71) Applicant: ExxonMobil Chemical Patents Inc., Baytown, TX (US)

(72) Inventors: Bruce J. Savatsky, Kingwood, TX (US); Brian R. Greenhalgh, Houston, TX (US); Joseph A. Moebus, Houston, TX (US); Aaron C. McGinnis, Houston, TX (US); Ryan W. Impelman, Houston, TX (US); Anne A. Bernard-Brunel, Le Havre (FR)

(73) Assignee: ExxonMobil Chemical Patents Inc., Baytown, TX (US)

( * ) Notice: Subject to any disclaimer, the term of this patent is extended or adjusted under 35 U.S.C. 154(b) by 705 days.

(21) Appl. No.: 17/310,699

(22) PCT Filed: Mar. 4, 2020

(86) PCT No.: PCT/US2020/021008
§ 371 (c)(1),
(2) Date: Aug. 18, 2021

(87) PCT Pub. No.: WO2020/190510
PCT Pub. Date: Sep. 24, 2020

(65) Prior Publication Data
US 2022/0098332 A1    Mar. 31, 2022

Related U.S. Application Data

(60) Provisional application No. 62/821,723, filed on Mar. 21, 2019.

(51) Int. Cl.
*C08F 2/34* (2006.01)

(52) U.S. Cl.
CPC ..................................... *C08F 2/34* (2013.01)

(58) Field of Classification Search
None
See application file for complete search history.

(56) References Cited

U.S. PATENT DOCUMENTS 9,718,896 B2   8/2017   Hari et al.
10,029,226 B2   7/2018   Hari et al.
(Continued)

*Primary Examiner* — Fred M Teskin
(74) *Attorney, Agent, or Firm* — ExxonMobil Technology and Engineering Company

(57) ABSTRACT

This disclosure relates to processes for producing polyolefins in a gas phase reactor using condensing agent(s) (CAs), and real-time calculation of the ratio of one type of CA to another CA within a CA composition. This disclosure provides methods for controlling condensed phase cooling in a gas phase reactor used to polymerize olefins. The polymerization may employ one or more polymerization catalysts to polymerize one or more olefin monomers, and may include introducing a first condensing agent and a second condensing agent in a ratio of first condensing agent to second condensing agent, which ratio is calculated by ascertaining a stick limit for a first condensing agent, calculating an equivalence factor relating the first condensing agent and a second condensing agent, ascertaining a total allowable condensing agent, and calculating a first amount of the first condensing agent removed and replaced by a second amount of the second condensing agent.

18 Claims, 15 Drawing Sheets

(56) References Cited

U.S. PATENT DOCUMENTS

2005/0182207 A1* 8/2005 Singh .................. C08F 10/02
                                                        526/901
2007/0265400 A1   11/2007 Fischbuck et al.
2013/0066027 A1    3/2013 Banat et al.
2015/0210782 A1    7/2015 Hari et al.
2017/0355791 A1   12/2017 Savatsky et al.

* cited by examiner

METHODS FOR IMPROVING GAS PHASE POLYMERIZATION

CROSS-REFERENCE OF RELATED APPLICATIONS

This application is a National Phase Application claiming priority to PCT Application Serial No. PCT/US2020/021008, filed Mar. 4, 2020, which claims the benefit of U.S. Provisional Application Ser. No. 62/821,723, filed Mar. 21, 2019 and entitled "Methods for Improving Gas Phase Polymerization," the disclosures of which are hereby incorporated by reference in their entireties.

FIELD

The present disclosure relates to systems and methods for operating a polyolefin polymerization reactor with improved production rates.

BACKGROUND

Polyolefins may be produced using gas phase polymerization processes. If the process is a gas-phase fluidized bed polymerization process, the process may include a gas stream including one or more monomers continuously passed through a fluidized bed of catalyst and growing polymer particles. As polymerization occurs, a portion of the monomers are consumed and the gas stream is heated in the reactor by the heat of polymerization. A portion of the gas stream exits the reactor and may be recycled back to the reactor with additional monomers and additives. The recycle stream may be cooled, so as to maintain the temperature of the resin and gas stream inside the reactor below the stickiness temperature, the temperature at which the reaction mixture including polymer particles begins to stick together forming agglomerates. Particle agglomerations may lead to the formation of chunks or sheets of polymer that cannot be removed from the reactor as product and which may fall onto the reactor distributor plate impairing fluidization of the bed or causing reactor failure. Additionally, since the polymerization reaction is exothermic, the amount of polymer produced in a fluidized bed polymerization process may be correlated to the amount of heat that can be withdrawn from the reaction zone.

There may be advantages to cool the recycle stream below its dew point resulting in condensing a portion of the gaseous recycle stream outside of the reactor. The dew point of the recycle stream is the temperature at which liquid condensate first begins to form in the gaseous recycle stream. The dew point can be calculated knowing the gas composition and is thermodynamically defined using an equation of state. The process of purposefully condensing a portion of the recycle stream is referred to in the industry as "condensed mode" operation. When a recycle stream temperature is lowered to a point below its dew point in condensed mode operation, an increase in polymer production may be possible.

Cooling of the recycle stream to a temperature below the dew point temperature produces a two-phase gas/liquid mixture that may have entrained solids contained in both phases. The liquid phase of the two-phase gas/liquid mixture in condensed mode operation is generally entrained in the gas phase of the mixture. Vaporization of the liquid occurs when heat is added or pressure is reduced. Generally, the vaporization occurs when the two-phase mixture enters the fluidized bed, with the heat of polymerization providing the heat of vaporization. The vaporization thus provides an additional means of extracting heat of reaction from the fluidized bed.

The cooling capacity of the recycle gas may be increased further while at a given reaction temperature and a given temperature of the cooling heat transfer medium by adding non-polymerizing, non-reactive materials to the reactor, which are condensable at the temperatures encountered in the process heat exchanger (cooler). The non-reactive condensable materials are collectively referred to as condensing agents (CAs), sometimes referred to as induced condensing agents because of the added cooling they induce. Increasing concentrations of CAs in the reactor causes corresponding increases in the dew point temperature of the reactor gas, which promotes higher levels of condensing, higher heat transfer (better cooling), and improved production rates from the reactor. However, the use of a CA is governed by its solubility in the polymer, where the CA acts to depress the polymer melting point. Attempts to operate polymerization reactors with excessive CA concentrations have led to the polymer particles suspended in the fluid bed to soften and become cohesive or "sticky" and, in some cases, to solidification of the fluid bed in the form of large chunks or sheets. While the use of a CA may improve polymer production, there remains a challenge in balancing the increased cooling capacity against polymer softening and stickiness.

Adding to the complexity of control of stickiness while using CAs, different polymer products vary widely in their ability to tolerate specific CAs, some having a relatively high tolerance (expressed in partial pressure of the CA in the reactor), e.g. 50 psia, while other polymers may tolerate as little as 5 psia. In polymers with lower tolerance, the heat transfer limited production rates under similar conditions are substantially lower. Polymers which possess a more uniform comonomer composition distribution may have a higher tolerance to the partial pressure of the CA in the reactor. Typical metallocene catalysts are a good example of catalysts that may produce polymers having a more uniform comonomer composition. However, at some point even these metallocene produced polymers reach a limiting CA concentration that induces stickiness. The concentration of a CA which causes the polymer particle to become sticky is referred to as the stick limit (SL) for that particular CA. The SL depends on several factors in addition to the polymer type, including reactor temperature, comonomer type and concentration. Further, with the effect of temperature, CA level, and comonomer levels all affecting the onset of stickiness, determining the point at which stickiness begins to occur can be challenging. Therefore, the concentration of a CA is maintained below its SL, allowing the reactor temperature to be maintained below the stickiness temperature.

It may be possible to use a combination of CAs (a CA composition) to increase condensed phase cooling (and therefore production rates) while avoiding the stickiness temperature in the reactor. For the production of polyolefins using a CA composition, there is a need to balance the ratios of various CAs to provide the maximum production rate while also avoiding the stickiness temperature. Not using a method to balance the ratios of CAs may cause a reactor to run at lower than optimal production rates—which is an unfavorable economic operating condition. Worse, a lack of methodology in balancing the composition of CAs could lead to reactor shutdown due to inadvertently running at a condition that exceeds the SL. The stickiness temperature of the polyolefin particles may vary with reactor conditions including pressure and composition of the gas stream entering the reactor. Because reactor conditions vary in real-time, the methods used to balance the ratios of CAs should also operate in real-time.

Even within the constraints of safe operation, real-time control of gas phase polymerization reactors is complex. The complexity of reactor control adds further to the difficulty and uncertainty of experimentation if one wishes to alter operating conditions to achieve higher production rates. Large-scale gas phase plants are expensive and highly productive. Risks associated with experimentation in such plants are high because downtime (such as that caused by passing the stick limit) is costly. Therefore, exploring design and operating boundaries experimentally is difficult in view of the costs and risks.

There is a remaining need for methods of determining stable operating conditions for gas fluidized bed polymerization with condensing agents, to facilitate design of the plant and the determination of suitable process conditions for suitable or maximum production rates in a given plant design. Furthermore, because reactor conditions vary with time there is a need for processes in the production of polyolefins in a gas phase reactor which allow real-time calculation of the ratio of CAs used in condensed phase cooling.

SUMMARY

This disclosure provides methods for controlling condensed phase cooling in a gas phase reactor used to polymerize olefins. In at least one embodiment, a method includes introducing one or more polymerization catalysts and one or more olefin monomers in a gas phase polymerization reactor. The method includes introducing a first condensing agent and a second condensing agent in a ratio of first condensing agent to second condensing agent. The ratio of the first condensing agent to the second condensing agent is calculated by ascertaining a stick limit for a first condensing agent, calculating an equivalence factor relating the first condensing agent and a second condensing agent, ascertaining a total allowable condensing agent, and calculating a first amount of the first condensing agent removed and replaced by a second amount of the second condensing agent. The method includes withdrawing a gas phase composition including at least a portion of the first condensing agent and the second condensing agent. The method includes condensing a portion of the gas phase composition yielding a condensed stream. The method includes recycling at least a portion of the condensed stream to the gas phase reactor.

BRIEF DESCRIPTION OF THE DRAWINGS

So that the manner in which the above recited features of the disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of scope, for the disclosure may admit to other equally effective implementations.

Figure 1:
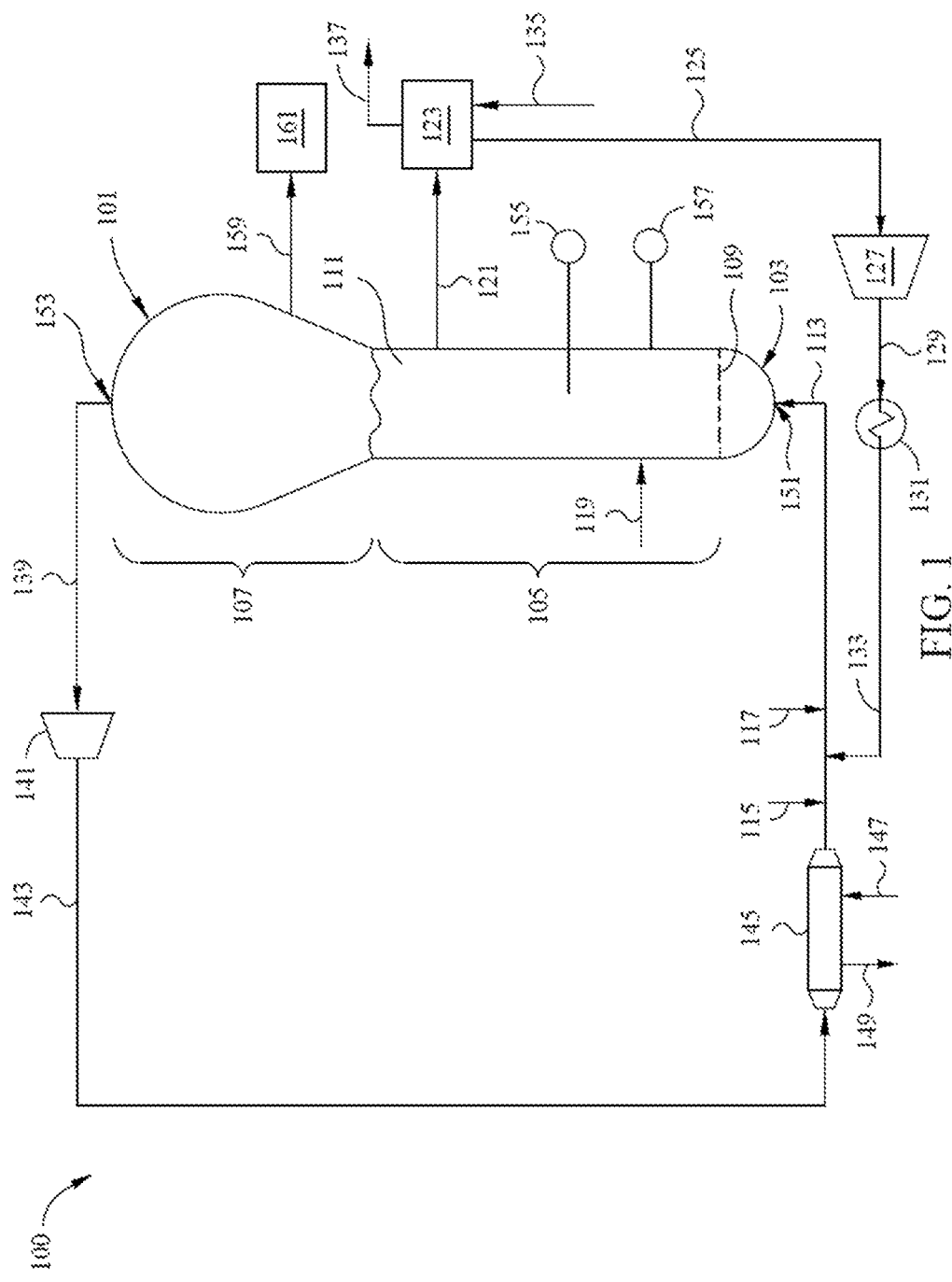
FIG. 1 is a schematic diagram of a gas phase polymerization system, according to one embodiment.

To facilitate understanding, identical reference numerals have been used, where possible, to designate identical elements that are common to the Drawings. It is contemplated that elements and features of one implementation may be beneficially incorporated in other implementations without further recitation.

DETAILED DESCRIPTION

The present disclosure relates to processes for production of polyolefins in a gas phase reactor using condensing agent(s) (CAs), and real-time calculation of the ratio of one type of CA to another CA within a CA composition. The use of condensed phase cooling allows for increased production rates as compared to cooling the recycle gas without condensing a portion of the gas to a liquid because the heat of vaporization of the liquid portion of the recycle stream increases cooling capacity. The use of more than a single CA may allow for even greater cooling because individual CAs have different effects on the stickiness temperature of the polymer being formed. In order to avoid reactor shutdown and operation under suboptimal conditions, a method to adjust the ratio of CAs entering the polymerization reactor should be accomplished in real-time. It has been discovered that the calculation and use of a suitable ratio of CAs may improve the polymer production rate and avoid exceeding the stick limit (SL). Calculation and use of a suitable ratio of CAs may be accomplished in real-time by ascertaining the SL for a first CA, ascertaining the equivalence of one or more additional CAs and the first CA, and calculating a ratio of CAs within a CA composition.

The methods described maintain or increase stickiness temperature during polyolefin polymerization by adjusting the ratio of different CAs within a CA composition. Additionally, adjusting the ratio of CAs in a CA composition may decrease the dew point of the CA composition (e.g., by increasing the concentration of a lower molecular weight CA component). Increased cooling may be achieved by increasing the total allowable CA composition within the reactor. The balance of individual types of CA in a CA composition reduces or eliminates the "stickiness" drawbacks of excessive CA composition concentrations. Further, the make-up of the CA composition can be changed in real-time according to equivalence factors relating a first CA and one or more additional CAs in relation to the stick limit of the first CA in order to achieve higher polyolefin production.

Definitions

The term "CA" refers to a condensing agent. "CAs" refers to condensing agents. "CA composition" refers to the total condensing agent in the reactor and encompasses compositions with two or more condensing agents. CAs suitable for use in methods of the present disclosure may include C3-C6 hydrocarbons or combinations thereof. For example, CAs suitable for use may include n-butane, isobutane, n-pentane, isopentane, neo-pentane, hexane, isohexane, and other hydrocarbon compounds that are similarly non-reactive in the polymerization process. A "binary CA composition" is a CA composition that includes two CAs, and a "ternary CA composition" is a CA composition that includes three CAs.

The terms "iC4" and "isobutane" refer to 2-methylpropane.

The terms "nC4" and "n-butane" refer to normal-butane.

The terms "iC5" and "isopentane" refer to 2-methylbutane.

The terms "nC5" and "n-pentane" refer to normal-pentane.

The terms "neoC5" and "neo-pentane" refer to 2,2-dimethylpropane.

The terms "nC6" and "n-hexane" refer to normal-hexane.

The term "C6 inerts" refers to various hexane isomers that are inert to reaction conditions and may include nC6, 2-methylpentane, 3-methylpentane, 2,2-dimethyl butane, 2,3-dimethylbutane, 2-hexene, and/or 3-hexene.

"Linear low density polyethylene" (LLDPE) is polyethylene in an overlapping density range, i.e., 0.890 to 0.930 g/cm$^3$, typically from 0.915 to 0.930 g/cm$^3$, that is linear and is substantially free of long chain branching. LLDPE can be produced with conventional Ziegler-Natta catalysts, vanadium catalysts, or with metallocene catalysts in gas phase reactors and/or in slurry reactors and/or in solution reactors.

"Linear" means that the polyethylene is substantially free of long chain branches, typically referred to as a branching index (g'$_{vis}$) of 0.97 or above, or 0.98 or above. Branching index, g'vis, is measured as described below.

As used herein, $M_n$ is number average molecular weight, $M_w$ is weight average molecular weight, and $M_z$ is z average molecular weight, wt % is weight percent, and mol % is mole percent. Molecular weight distribution (MWD), also referred to as polydispersity index (PDI), is defined to be Mw divided by Mn. Unless otherwise noted, all molecular weights (e.g., Mw, Mn, Mz) are reported in units of g/mol.

The term "real-time" means data processed, and systems adjusted, without intentional delay, given the processing limitations of the system and the time to accurately measure the data.

With reference to a product being produced by a continuous reaction, the expression "instantaneous" value of a property of the product denotes the value of the property of the most recently produced quantity of the product. The most recently produced quantity typically undergoes mixing with previously produced quantities of the product before a mixture of the recently and previously produced product exits the reactor. In contrast, with reference to a product being produced by a continuous reaction, "average" (or "bed average") value (at a time "T") of a property denotes the value of the property of the product that exits the reactor at time T.

The term "polyethylene" denotes a polymer of ethylene and optionally one or more C3-C18 alpha-olefins, while the term "polyolefin" denotes a polymer of one or more C2-C18 alpha-olefins and optionally one or more comonomers. An "olefin" is an unsaturated hydrocarbon that contains at least one carbon-carbon double bond. An alpha-olefin is a hydrocarbon that contains at least one carbon-carbon double bond at one end of a carbon chain (e.g. 1-butene, vinyl-cyclohexane). For the purposes of this disclosure, ethylene shall be considered an α-olefin.

The term "melt index" refers to a measure of the use of flow of the melt of the thermoplastic polymer. Melt index may be measured according to ASTM D1238-13 at suitable weight and temperature. Generally, the melt index of polyolefins is measured at 2.16 kg at 190° C., 5 kg at 190° C., or 21.6 kg at 190° C.

Polymerization Reactor

The methods described may be used in pilot plant or commercial size reactors including a variety of designs. For example, the model can be used in commercial-scale reactions, such as gas-phase fluidized-bed polymerization reactions, that can be monitored and optionally also controlled. Some such reactions can occur in a reactor having the geometry of the fluidized bed reactor 101 discussed with respect to FIG. 1. In other embodiments, a reactor is monitored and optionally also controlled while operating to perform polymerization using any of a variety of different processes (e.g., slurry or gas phase processes).

Generally, in a fluidized gas bed process used for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are incorporated by reference.)

FIG. 1 is a schematic diagram of a polymerization system 100 that can be monitored and controlled in accordance with embodiments described. The polymerization system 100 includes a fluidized bed reactor 101. The fluidized bed reactor 101 has a bottom end 103, a straight section 105, a top expanded section 107, and a distributor plate 109 within the straight section 105. A fluidized bed 111 of granular polymer (once formed) and catalyst particles is contained within the straight section 105, and may optionally extend slightly into the top expanded section 107. The bed is fluidized by the steady flow of recycle gas through the distributor plate 109. The recycle gas enters fluidized bed reactor through line 113, additional reaction and inert gases (including CAs) may be added in adjustable ratios through line 115. Aluminum alkyl (optional) may be added through line 117. The flow rate of the recycle gas is regulated to maintain circulation of fluidized bed 111. In some embodiments, a recycle gas velocity of from about 1 ft/sec to about 3 ft/sec, such as from about 2 ft/sec to about 3 ft/sec, or from about 2.4 ft/sec to about 2.8 ft/sec is used to maintain a fluidized bed 111 in the reactor 101 while operating the reactor 101 at a total pressure of about 4200 kPa or less, about 700 kPa to about 4200 kPa, about 1300 kPa to about 2800 kPa, or about 1700 kPa to about 2500 kPa.

The polymerization system 100 has one or more catalyst lines 119 for controlling the addition of polymerization catalyst to a reaction zone (not shown) within fluidized bed 111, and generally within straight section 105. Within the reaction zone, the catalyst particles react with reaction gases including an olefin monomer (e.g., ethylene) and optionally a comonomer and other reaction gases (e.g., hydrogen) to produce the granular polymer particles. As new polymer particles are produced, other polymer particles are continually withdrawn from the fluidized bed 111 through a product discharge line 121 to product recovery system 123. The fluidized bed 111 may be maintained at a constant height by withdrawing a portion of the fluidized bed 111 at a rate equal to the rate of formation of particulate product. The product may be removed continuously or nearly continuously via a series of valves (not shown) into a fixed volume chamber (not shown), which is simultaneously vented back to the reactor. The fixed volume chamber and venting back to the reactor allows for highly efficient removal of the product, while recycling a large portion of the unreacted gases back to the reactor.

Unreacted olefins and CA composition within the product recovery system may be removed via line 125, compressed in compressor 127, and travel via line 129 to heat exchanger 131 to be cooled before being recycled (e.g., via line 133) to line 113. The particles within product recovery system 123 may be degassed (or "purged") with a flow of inert gas such as nitrogen through line 135 to remove substantially all of the dissolved hydrocarbon materials. In some instances, the polymer granules may be treated with a small stream of humidified nitrogen to deactivate trace quantities of residual catalyst. The purge gas may be removed via line 137 to be vented to flare or recycled with further processing.

The polymerization system 100 also has a cooling loop which includes a first recycle gas line 139, compressor 141, a second recycle gas line 143, and cooling system 145 (such as a circulating gas cooler), coupled with the fluidized bed reactor 101. Cooling system 145 may accept cooling water via line 147 and expel heated water via line 149. Cooling of the recycle gas is a method used to cool polymerization system 100 to reduce or eliminate issues that may arise from exothermic polyolefin production. During operation, the cooled circulating gas from cooling system 145 flows via line 113 through inlet 151 into the fluidized bed reactor 101, then propagates upward through fluidized bed 111 and out from the fluidized bed reactor 102 via outlet 153.

The top expanded section 107 may also be known as a "velocity reduction zone," and is designed to reduce the quantities of particle entrainment in the recycle gas line from the fluidized bed. The diameter of the top expanded section 107 generally increases with the distance from straight section 105. The increased diameter causes a reduction in the speed of the gas stream, which allows most of the entrained particles to settle back into the fluidized bed 111, thereby minimizing the quantities of solid particles that are "carried over" from the fluidized bed 111 through the recycle gas line 139. In some instances, a screen (not shown) may be included upstream of the compressor 141 to remove larger material.

To maintain a reactor temperature, the temperature of the recycle gas may be continuously adjusted up or down to accommodate changes in the rate of heat generation due to the polymerization. One or more temperature sensors 155 may be located in the fluidized bed, and used with a control system and the cooling loop to control the temperature of the fluidized bed 111 near the process set-point. Heated reactor gas, which carries heat energy from the fluidized bed reactor 101, is withdrawn from the outlet 153 and is pumped by the compressor 141 via line 143 to cooling system 145 where the temperature of the heated reactor gas is reduced and at least a portion of the CA composition present is condensed to a liquid. The recycle gas from the cooling system 145, including condensed liquids, flows via line 113 to the reactor inlet 151 to cool the fluidized bed 111. Temperature sensors (not shown) near the inlet and outlet of the cooling system 145 may provide feedback to a control system (not shown) to regulate the amount by which cooling system 145 reduces the temperature of the recycle gas entering the fluidized bed reactor 101.

The fluidized bed reactor 101 may also include skin temperature sensors 157, mounted in positions along a wall of the straight section 105 of the fluidized bed reactor 101 so as to protrude into the bed from the reactor wall by a small amount (e.g., about one eighth to one quarter of an inch). The skin temperature sensors 157 may be configured and positioned to sense the temperature of the resin near the wall of the fluidized bed reactor 101 during operation.

The temperature sensors 155 in the fluidized bed 111 can include a resistance temperature sensor positioned and configured to sense bed temperature during reactor operation at a location within the fluidized bed reactor 101 away from the reactor wall. The resistance temperature sensor can be mounted so as to protrude into the bed more deeply than the skin temperature sensors 157 (e.g., about 8 to 18 inches away from the reactor wall).

Other sensors and other apparatuses may be employed to measure other reaction parameters during a polymerization reaction. The reaction parameters may include instantaneous and bed-averaged resin product properties (e.g., melt index and density of the polymer resin product being produced by the polymerization system 100 during a polymerization reaction). Resin product properties may be measured by periodically sampling the resin when exiting the reactor (e.g., about once per hour), and performing the appropriate tests in a quality control laboratory.

Other measured reaction parameters may include reactor gas composition (e.g., concentrations and partial pressures of reactant gases, CA, and other inert gases, such as nitrogen, inert hydrocarbon, and the like). The reactor gas composition may be measured by removal of gas from upper portion 107 via line 159 to a gas chromatograph ("GC") system 161. GC system 161 may also be connected by lines (not shown) other than line 159 to other parts of polymerization system 100, such as recycle gas line 139, compressor 141, line 143 or any combination thereof.

The process control variables may be controlled to obtain the desired productivity for the polymerization system 100 and properties for the resin. For example, the parameters used to control gas phase composition within the fluidized bed reactor 101 can include the concentration (partial pressure) and composition of the CA composition and comonomer, the partial pressure of monomer, the type and properties of catalysts, and the temperature of the reaction process. For example, a polymerization reaction during a transition from production of a certain grade of polyolefin to a different grade may be controlled by controlling process control variables to ensure that the product (e.g., the granular resin) has properties compliant with an initial specification set at the start of the transition, the product produced during the transition ceases to comply with the initial specification set at a first time, and the product has properties compliant with a final specification set at the end of the transition. In the methods described, stickiness of the resin during the reaction may be controlled by a control system adjusting (or regulating) the temperature and/or the composition and concentration of the CA composition used in the reaction.

Figure 2:
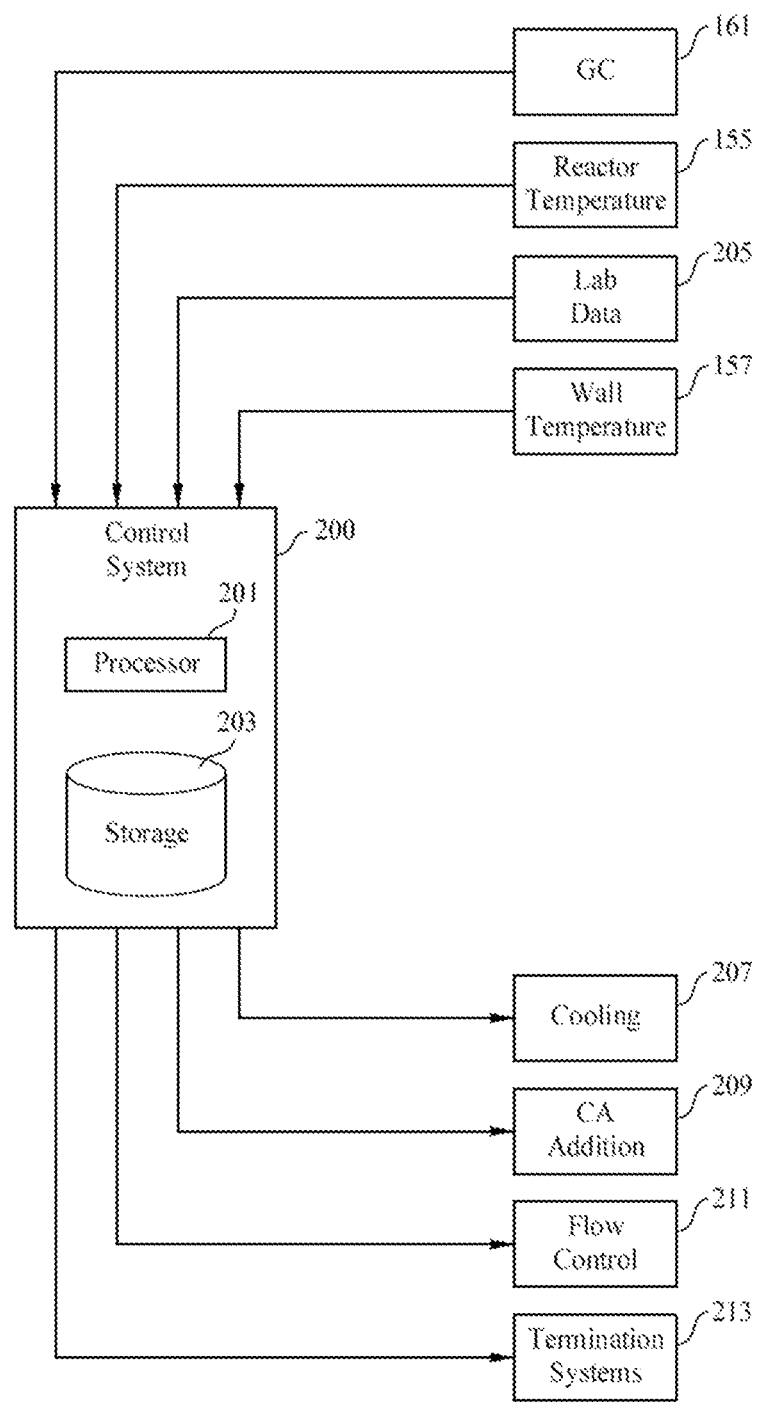
FIG. 2 is a diagram of a control system for controlling a gas phase polymerization process, according to one embodiment.

FIG. 2 is a block diagram of a control system 200 that can be used to control the polymerization system 100. The control system 200 may be a distributed control system (DCS), a direct digital controller (DDC), a programmable logic controller (PLC), or other suitable systems or combination of systems. The control system 200 has a processor 201 that implements machine readable instructions from a storage system 203. Illustrative processors may include a single core processor, a multiple core processor, a virtual processor, a virtual processor in a cloud implementation, an application specific integrated circuit (ASIC), or a combination of these systems. Illustrative storage systems 203 can include random access memory (RAM), read only memory (ROM), hard drives, virtual hard drives, RAM drives, cloud storage systems, optical storage systems, physically encoded instructions (for example, in an ASIC), or a combination of these systems.

Adjustments to control settings may be determined based on the input of data from temperature sensors 155 and 157, the GC 161, and lab data 205, among others. After determining new control settings, the control system 200 may make in real time, or recommend, adjustments, for example, to the process cooling systems 207, the CA addition and recycling systems 209, flow control systems 211, and termination systems 213, among others.

The reactor and associated methods may be an element of a staged reactor employing two or more reactors in series, where one reactor may produce, for example, a high molecular weight polyolefin and another reactor may produce a low molecular weight polyolefin.

Figure 3:
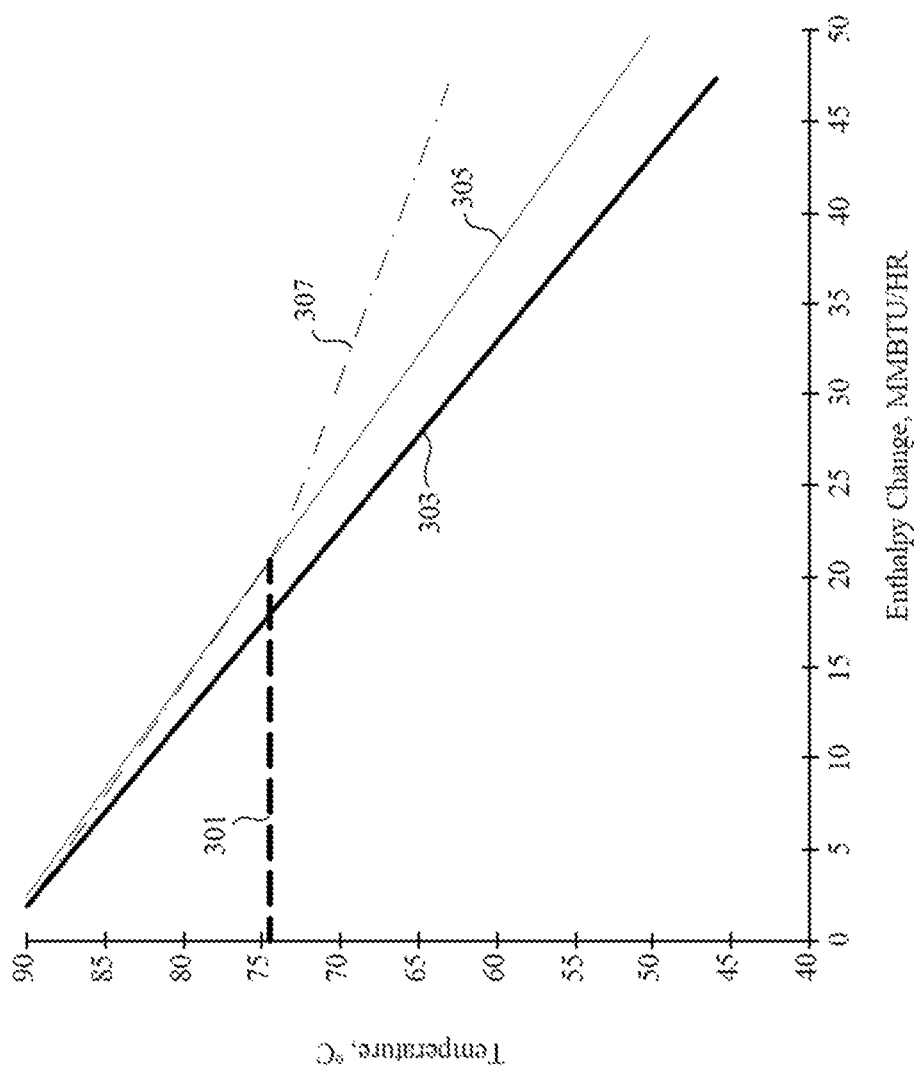
FIG. 3 is a comparison of gas phase polymerization in dry mode, enhanced dry mode, and condensed mode, according to one embodiment.

The cooled recycle gas may provide for exemplary non-limiting embodiments of cooling of the polymerization system. For example, the ability to cool the polymerization system may have a direct correlation with the heat capacity of the recycle gas, known as "dry mode." It is possible to add inert gases to the recycle gas with greater heat capacity which improves the cooling, but direct correlation with the heat capacity can be maintained to cool the polymerization system in "enhanced dry mode." Additionally or alternatively, the dry modes can be deviated from by cooling the recycle gas past its dew point and condensing a portion of the gas to a liquid. The liquid has greater ability to cool the polymerization system than the gas because of the liquid's heat of vaporization. An example of the difference in cooling capacity is shown in FIG. 3, comparing cooling in different embodiments. Line 301 represents the dew point of the recycle gas within a polymerization system. Under dry conditions (represented by line 303), the recycle gas provides cooling of the reactor in direct relation to the temperature to which it is cooled. In enhanced dry mode (represented by line 305), the addition of inert gases to the recycle gas allows for slightly greater reactor cooling based on the temperature to which it is cooled in the cooling system. Lastly, line 307 represents condensed phase cooling, which allows even greater cooling by the addition of condensing agents, or inert gases that are condensed past the dew point and therefore have more ability to cool the reactor because of their heat of vaporization.

Polyolefin Production

Polyolefin polymerization may be performed by contacting in a reactor (such as the fluidized bed reactor 101 of FIG. 1) an olefin monomer (optionally with a comonomer) with one or more catalysts (supported or not) in the presence of CA composition and optionally hydrogen. The individual flow rates of olefin monomer, optional comonomer, optional hydrogen, and CA composition (or individual components thereof) may be controlled to maintain fixed gas composition targets. The concentration of all gases may be measured with a chromatograph. A solid catalyst, a catalyst slurry, or liquid solution of the catalyst(s) may be injected directly into the reactor using a carrier gas (e.g., purified nitrogen), where the feed rate of catalyst(s) may be adjusted to change or maintain the catalyst inventory in the reactor.

In some embodiments, the polymerization reaction may be performed at a reactor pressure of about 4200 kPa or less, about 700 kPa to about 4200 kPa, about 1300 kPa to about 2800 kPa, or about 1700 kPa to about 2500 kPa.

Generally, the olefin monomer concentration is controlled and monitored by the olefin monomer partial pressure. In some embodiments, the olefin partial pressure may be at about 4200 kPa or less, such as about 500 kPa to about 2000 kPa, about 1000 kPa to about 1800 kPa, about 1200 kPa to about 1700 kPa, or about 1400 kPa to about 1600 kPa.

The comonomer concentration may be controlled and monitored by a comonomer to olefin monomer mole ratio (or alternatively, the flow rates of comonomer and olefin monomer are held at a fixed ratio). When present, the comonomer may be at a relative concentration to the olefin monomer that will achieve the desired weight percent incorporation of the comonomer into the finished polyolefin. In some embodiments, the comonomer may be present with the olefin monomer in a mole ratio in the gas phase of from about 0.0001 to about 50 (comonomer to olefin monomer), from about 0.0001 to about 5, from about 0.0005 to about 1.0, or from about 0.001 to about 0.5.

The olefin monomer or comonomers, for example, may be a C2-C18 alpha-olefin. In some embodiments, the olefin monomer is ethylene, and a comonomer is a C3-C12 alpha olefin. In some embodiments, the olefin monomer may be ethylene or propylene, and a comonomer may include C4-C10 alpha-olefins. For example C2-C18 alpha-olefins that may be utilized as a comonomer in embodiments described may include: ethylene, propylene, 1-butene, 1-pentene, 1-hexene, 1-heptene, 1-octene, 4-methylpent-1-ene, 1-decene, 1-dodecene, 1-hexadecene, and the like, and a combination thereof. Additionally, a polyene may be used as a comonomer according to some embodiments described. For example, polyenes may include: 1,3-hexadiene, 1,4- hexadiene, cyclopentadiene, dicyclopentadiene, 4-vinylcyclohex-1-ene, methyloctadiene, 1-methyl-1,6-octadiene, 7-methyl-1,6-octadiene, 1,5-cyclooctadiene, norbornadiene, ethylidene norbornene, 5-methylidene-2-norbornene, 5-vinyl-2-norbornene, and olefins formed in situ in the polymerization medium. When olefins are formed in situ in the polymerization medium, the formation of polyolefins containing long chain branching may occur. Additional examples of comonomers may include isoprene, styrene, butadiene, isobutylene, chloroprene, acrylonitrile, and cyclic olefins. Combinations of the foregoing may be utilized in the methods described.

Examples of polymers that can be produced in accordance with the method described may include the following: homopolymers and copolymers of C2-C18 alpha olefins; polyvinyl chlorides, ethylene propylene rubbers (EPRs); ethylene-propylene diene rubbers (EPDMs); polyisoprene; polystyrene; polybutadiene; polymers of butadiene copolymerized with styrene; polymers of butadiene copolymerized with isoprene; polymers of butadiene with acrylonitrile; polymers of isobutylene copolymerized with isoprene; ethylene butene rubbers and ethylene butene diene rubbers; polychloroprene; norbornene homopolymers and copolymers with one or more C2-C18 alpha olefin; and terpolymers of one or more C2-C18 alpha olefins with a diene. In some embodiments, the polyolefin produced by the method described may include olefin homopolymers (e.g., homopolymers of ethylene or propylene). In some instances, the polyolefin produced may be copolymers, terpolymers, and the like of the olefin monomer and the comonomer.

In some embodiments, the polyolefin produced may be a polyethylene or a polypropylene. Exemplary polyethylenes produced by the methods described may be homopolymers of ethylene or copolymers of ethylene (or terpolymers of ethylene) having at least one alpha-olefin (comonomer) where the ethylene content may be at least about 50% by weight of the total monomers involved. Exemplary polypropylenes produced by the methods described may be homopolymers of propylene or interpolymers of propylene and at least one alpha-olefin (comonomer) where the propylene content may be at least about 50% by weight of the total monomers involved.

Hydrogen gas is often used in olefin polymerization to control the final properties of the polyolefin. For some types of catalyst systems, increasing concentrations (or partial pressures) of hydrogen may alter the molecular weight or melt index of the polyolefin generated. The melt index can thus be influenced by the hydrogen concentration. Generally, the amount of hydrogen in the polymerization is expressed as a mole ratio relative to the total polymerizable monomer (e.g., relative to ethylene or relative to a blend of ethylene and hexene or propylene). The amount of hydrogen used in some polymerization processes is an amount necessary to achieve the desired melt index (or molecular weight) of the final polyolefin resin. In some embodiments, the mole ratio in the gas phase of hydrogen to total polymerizable monomer ($H_2$ to monomer) may be about 0.00001 or greater, about 0.0005 or greater, about 0.001 or greater, about 10 or less, about 5 or less, about 3 or less, or about 0.10 or less, where a range may include a combination of a upper mole ratio with a lower mole ratio described.

Catalysts

Exemplary catalysts suitable for use in the embodiments described may include: Ziegler Natta catalysts, chromium based catalysts, vanadium based catalysts (e.g., vanadium oxychloride and vanadium acetylacetonate), metallocene catalysts and other single-site or single-site-like catalysts, cationic forms of metal halides (e.g., aluminum trihalides), anionic initiators (e.g., butyl lithiums), cobalt catalysts and mixtures thereof, nickel catalysts and mixtures thereof, rare earth metal catalysts (i.e., those containing a metal having an atomic number in the Periodic Table of 57 to 103), such as compounds of cerium, lanthanum, praseodymium, gadolinium and neodymium. A single catalyst may be used, or a mixture of catalysts may be employed, if desired. The catalyst may be soluble or insoluble, supported or unsupported. Further, the catalyst may be a prepolymer, spray dried with or without a filler, a liquid, or a solution, slurry/suspension, or dispersion.

Metallocenes may include "half sandwich" and "full sandwich" compounds having one or more pi-bonded ligands (e.g. cyclopentadienyl and ligands isolobal to cyclopentadienyl) bound to at least one Group 3 to Group 12 metal atom (Including the Lanthanide series and Actinide series elements), and one or more leaving groups bound to the at least one metal atom. The metallocene may be supported on a support material, and may be supported with or without another catalyst component.

The pi-bonded ligands may be one or more rings or ring systems, such as cycloalkadienyl ligands and heterocyclic analogues. The pi-bonded ligands are distinct from the leaving groups bound to the catalyst compound in that they are not highly susceptible to substitution or abstraction reactions. If a metallocene catalyst has more than one pi-bonded ligand they may be the same or different, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In some embodiments, pi-bonded ligands are (independently in the case of multiple) selected from cyclopentadienyl, indenyl, tetrahydroindenyl, fluorenyl, and substituted derivatives of each. In relation to hydrocarbon substituents, the term "substituted" means that the group following that term possesses at least one moiety in place of one or more hydrogens, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls may include: acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.

In some embodiments, each leaving group may be independently selected from halogen ions, hydrides, C1-12 alkyls, C2-12 alkenyls, C6-12 aryls, C7-20 alkylaryls, C1-12 alkoxys, C6-16 aryloxys, C7-18 alkylaryloxys, C1-12 fluoroalkyls, C6-12 fluoroaryls, and C1-12 heteroatom-containing hydrocarbons, and substituted derivatives thereof. The phrase "leaving group" refers to one or more chemical moieties bound to the metal center of the catalyst component, which can be abstracted from the catalyst component by an activator, thus producing a species active towards olefin polymerization or oligomerization.

The structure of the metallocene catalyst compound may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213. Others include those catalysts described in U.S. Patent Application Publication Nos. US2005/0124487A1, US2005/0164875A1, and US2005/0148744. In some embodiments, the metallocene may be formed with a hafnium metal atom (e.g., bis(n-propylcyclopentadienyl) hafnium Xn, bis(n-butylcyclopentadienyl) hafnium Xn, or bis(n-pentylcyclopentadienyl) hafnium Xn, where X is one of chloride or fluoride and n is 2), such as is described in U.S. Pat. Nos. 6,242,545 and 7,157,531.

In certain embodiments, the metallocene catalysts compounds described above may include their structural or optical or enantiomeric isomers (racemic mixture), and, in some embodiments, may be a pure enantiomer.

In some embodiments, the catalyst may be a metallocene catalyst in the absence of, or essentially free of, scavengers (e.g., triethylaluminum, trimethylaluminum, tri-isobutylaluminum, tri-n-hexylaluminum, diethyl aluminum chloride, dibutyl zinc and the like). The term "essentially free" means that the compounds are not deliberately added to the reactor or reactor components, and if present, are present in less than about 1 ppm in the reactor.

In some embodiments, the catalysts may be used with cocatalysts and promoters (e.g., alkylaluminums, alkylaluminum halides, alkylaluminum hydrides, and aluminoxanes).

In some instances, the one or more catalysts may be combined with up to about 10 wt % of one or more antistatic agents, such as a metal-fatty acid compound (e.g., an aluminum stearate), based upon the weight of the catalyst system (or its components). Other metals that may be suitable include other Group 2 and Group 5-13 metals. One or more antistatic agents may be added directly to the reactor system as well.

In some instances, supported catalyst(s) may be combined with activators by tumbling and/or other suitable means, optionally with up to about 2.5 wt % (by weight of the catalyst composition) of an antistatic agent. Exemplary antistatic agent may include: an ethoxylated or methoxylated amine (e.g., KEMAMINE AS-990, available from ICI Specialties) and polysulfone copolymers in the OCTASTAT family of compounds, more specifically Octastat 2000, 3000, and 5000 (available from Octel).

In some embodiments, the antistatic agent may be mixed with the catalyst and fed into the reactor. In other embodiments, the antistatic agent may be fed into the reactor separate from the catalyst. One advantage of feeding an anti-static agent o the reactor separate from the catalyst is that it permits on-line adjustment of the level of the additive. The antistatic agents may individually be in a solution, slurry, or as a solid (e.g. as a powder) before introduction into the reactor.

In various embodiments, a polymerization reaction according to the methods described may optionally employ other additives, such as inert particulate particles.

In some embodiments, the polymerization reaction temperature may be about 30° C. to about 120° C., about 60° C. to about 115° C., about 70° C. to about 110° C., or about 70° C. to about 105° C.

In at least one embodiment, the present disclosure provides a catalyst system comprising a catalyst compound having a metal atom. The catalyst compound can be a metallocene catalyst compound. The metal can be a Group 3 through Group 12 metal atom, such as Group 3 through Group 10 metal atoms, or lanthanide Group atoms. The catalyst compound having a Group 3 through Group 12 metal atom can be monodentate or multidentate, such as bidentate, tridentate, or tetradentate, where a heteroatom of the catalyst, such as phosphorous, oxygen, nitrogen, or sulfur is chelated to the metal atom of the catalyst. Non-limiting examples include bis(phenolate)s. In at least one embodiment, the Group 3 through Group 12 metal atom is selected from Group 5, Group 6, Group 8, or Group 10 metal atoms. In at least one embodiment, a Group 3 through Group 10 metal atom is selected from Cr, Sc, Ti, Zr, Hf, V, Nb, Ta, Mn, Re, Fe, Ru, Os, Co, Rh, Ir, and Ni. In at least one embodiment, a metal atom is selected from Groups 4, 5, and 6 metal atoms. In at least one embodiment, a metal atom is a Group 4 metal atom selected from Ti, Zr, or Hf. The oxidation state of the metal atom can range from 0 to +7, for example +1, +2, +3, +4, or +5, for example +2, +3 or +4.

A catalyst compound of the present disclosure can be a chromium or chromium-based catalyst. Chromium-based catalysts include chromium oxide ($CrO_3$) and silylchromate catalysts. Chromium catalysts have been the subject of much development in the area of continuous fluidized-bed gas-phase polymerization for the production of polyethylene polymers. Such catalysts and polymerization processes have been described, for example, in U.S. Patent Application Publication No. 2011/0010938 and U.S. Pat. Nos. 7,915,357, 8,129,484, 7,202,313, 6,833,417, 6,841,630, 6,989,344, 7,504,463, 7,563,851, 8,420,754, and 8,101,691.

Metallocene catalyst compounds as used herein include metallocenes comprising Group 3 to Group 12 metal complexes, for example, Group 4 to Group 6 metal complexes, for example, Group 4 metal complexes. The metallocene catalyst compound of catalyst systems of the present disclosure may be unbridged metallocene catalyst compounds represented by the formula: $Cp^A Cp^B M'X'_n$, wherein each $Cp^A$ and $Cp^B$ is independently selected from cyclopentadienyl ligands and ligands isolobal to cyclopentadienyl, one or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. R" is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, ether, and thioether.

In at least one embodiment, each $Cp^A$ and $Cp^B$ is independently selected from cyclopentadienyl, indenyl, fluorenyl, cyclopentaphenanthreneyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, and hydrogenated versions thereof.

The metallocene catalyst compound may be a bridged metallocene catalyst compound represented by the formula: $Cp^A(A)Cp^B M'X'_n$, wherein each $Cp^A$ and $Cp^B$ is independently selected from cyclopentadienyl ligands and ligands isolobal to cyclopentadienyl. One or both $Cp^A$ and $Cp^B$ may contain heteroatoms, and one or both $Cp^A$ and $Cp^B$ may be substituted by one or more R" groups. M' is selected from Groups 3 through 12 atoms and lanthanide Group atoms. X' is an anionic leaving group. n is 0 or an integer from 1 to 4. (A) is selected from divalent alkyl, divalent lower alkyl, divalent substituted alkyl, divalent heteroalkyl, divalent alkenyl, divalent lower alkenyl, divalent substituted alkenyl, divalent heteroalkenyl, divalent alkynyl, divalent lower alkynyl, divalent substituted alkynyl, divalent heteroalkynyl, divalent alkoxy, divalent lower alkoxy, divalent aryloxy, divalent alkylthio, divalent lower alkylthio, divalent arylthio, divalent aryl, divalent substituted aryl, divalent heteroaryl, divalent aralkyl, divalent aralkylene, divalent alkaryl, divalent alkarylene, divalent haloalkyl, divalent haloalkenyl, divalent haloalkynyl, divalent heteroalkyl, divalent heterocycle, divalent heteroaryl, a divalent heteroatom-containing group, divalent hydrocarbyl, divalent lower hydrocarbyl, divalent substituted hydrocarbyl, divalent heterohydrocarbyl, divalent silyl, divalent boryl, divalent phosphino, divalent phosphine, divalent amino, divalent amine, divalent ether, divalent thioether. R'' is selected from alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, alkylthio, lower alkylthio, arylthio, aryl, substituted aryl, heteroaryl, aralkyl, aralkylene, alkaryl, alkarylene, haloalkyl, haloalkenyl, haloalkynyl, heteroalkyl, heterocycle, heteroaryl, a heteroatom-containing group, hydrocarbyl, lower hydrocarbyl, substituted hydrocarbyl, heterohydrocarbyl, silyl, boryl, phosphino, phosphine, amino, amine, germanium, ether, and thioether.

In at least one embodiment, each of $Cp^A$ and $Cp^B$ is independently selected from cyclopentadienyl, n-propylcyclopentadienyl, indenyl, pentamethylcyclopentadienyl, tetramethylcyclopentadienyl, and n-butylcyclopentadienyl. (A) may be 0, S, NR', or SiR'$_2$, where each R' is independently hydrogen or $C_1$-$C_{20}$ hydrocarbyl.

In another embodiment, the metallocene catalyst compound is represented by the formula:

$T_yCp_mMG_nX_q$ where Cp is independently a substituted or unsubstituted cyclopentadienyl ligand or substituted or unsubstituted ligand isolobal to cyclopentadienyl such as indenyl, fluorenyl and indacenyl. M is a Group 4 transition metal. G is a heteroatom group represented by the formula $JR^*_z$ where J is N, P, O or S, and R* is a linear, branched, or cyclic $C_1$-$C_{20}$ hydrocarbyl. z is 1 or 2. T is a bridging group. y is 0 or 1. X is a leaving group. m=1, n=1, 2 or 3, q=0, 1, 2 or 3, and the sum of m+n+q is equal to the oxidation state of the transition metal.

In at least one embodiment, J is N, and R* is methyl, ethyl, propyl, butyl, pentyl, hexyl, heptyl, octyl, nonyl, cyclooctyl, cyclododecyl, decyl, undecyl, dodecyl, adamantyl or an isomer thereof.

The metallocene catalyst compound may be selected from:
bis(1-methyl, 3-n-butyl cyclopentadienyl) zirconium dichloride;
dimethylsilyl bis(tetrahydroindenyl) zirconium dichloride;
bis(n-propylcyclopentadienyl) hafnium dimethyl;
dimethylsilyl (tetramethylcyclopentadienyl)(cyclododecylamido)titanium dimethyl;
dimethylsilyl (tetramethylcyclopentadienyl)(cyclododecylamido)titanium dichloride;
dimethylsilyl (tetramethylcyclopentadienyl)(t-butylamido)titanium dimethyl;
dimethylsilyl (tetramethylcyclopentadienyl)(t-butylamido)titanium dichloride;
μ-$(CH_3)_2$Si(cyclopentadienyl)(1-adamantylamido)M(R)$_2$;
μ-$(CH_3)_2$Si(3-tertbutylcyclopentadienyl)(1-adamantylamido)M(R)$_2$;
μ-$(CH_3)_2$(tetramethylcyclopentadienyl)(1-adamantylamido)M(R)$_2$;
μ-$(CH_3)_2$Si(tetramethylcyclopentadienyl)(1-adamantylamido)M(R)$_2$;
μ-$(CH_3)_2$C(tetramethylcyclopentadienyl)(1-adamantylamido)M(R)$_2$;
μ-$(CH_3)_2$Si(tetramethylcyclopentadienyl)(1-tertbutylamido)M(R)$_2$;
μ-$(CH_3)_2$Si(fluorenyl)(1-tertbutylamido)M(R)$_2$;
μ-$(CH_3)_2$Si(tetramethylcyclopentadienyl)(1-cyclododecylamido)M(R)$_2$;
μ-$(C_6H_5)_2$C(tetramethylcyclopentadienyl)(1-cyclododecylamido)M(R)$_2$;
μ-$(CH_3)_2$Si($\eta^5$-2,6,6-trimethyl-1,5,6,7-tetrahydro-s-indacen-1-yl)(tertbutylamido)M(R)$_2$;
where M is selected from Ti, Zr, and Hf; and R is selected from halogen or $C_1$ to $C_5$ alkyl.

In at least one embodiment, the catalyst compound is a bis(phenolate) catalyst compound represented by Formula (I):

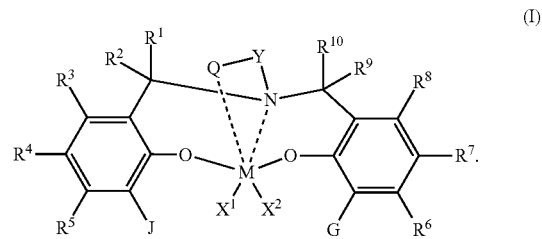

M is a Group 4 metal. $X^1$ and $X^2$ are independently a univalent $C_1$-$C_{20}$ hydrocarbyl, $C_1$-$C_{20}$ substituted hydrocarbyl, a heteroatom or a heteroatom-containing group, or $X^1$ and $X^2$ join together to form a $C_4$-$C_{62}$ cyclic or polycyclic ring structure. $R^1$, $R^2$, $R^3$, $R^4$, $R^5$, $R^6$, $R^7$, $R^8$, $R^9$, and $R^{10}$ is independently hydrogen, $C_1$-$C_{40}$ hydrocarbyl, $C_1$-$C_{40}$ substituted hydrocarbyl, a heteroatom or a heteroatom-containing group, or two or more of $R^1$, $R^2$, $R^3$, $R^4$, $R^5$, $R^6$, $R^7$, $R^8$, $R^9$, or $R^{10}$ are joined together to form a $C_4$-$C_{62}$ cyclic or polycyclic ring structure, or a combination thereof. Q is a neutral donor group. J is heterocycle, a substituted or unsubstituted $C_7$-$C_{60}$ fused polycyclic group, where at least one ring is aromatic and where at least one ring, which may or may not be aromatic, has at least five ring atoms. G is as defined for J or may be hydrogen, $C_2$-$C_{60}$ hydrocarbyl, $C_1$-$C_{60}$ substituted hydrocarbyl, or may independently form a $C_4$-$C_{60}$ cyclic or polycyclic ring structure with $R^6$, $R^7$, or $R^8$ or a combination thereof. Y is divalent $C_1$-$C_{20}$ hydrocarbyl or divalent $C_1$-$C_{20}$ substituted hydrocarbyl or (-Q*-Y—) together form a heterocycle. Heterocycle may be aromatic and/or may have multiple fused rings.

In at least one embodiment, the catalyst compound represented by Formula (I) is:

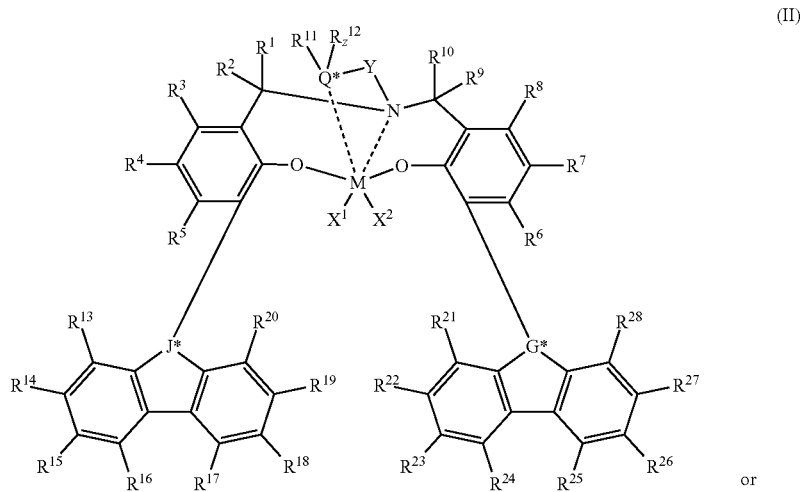

(II)

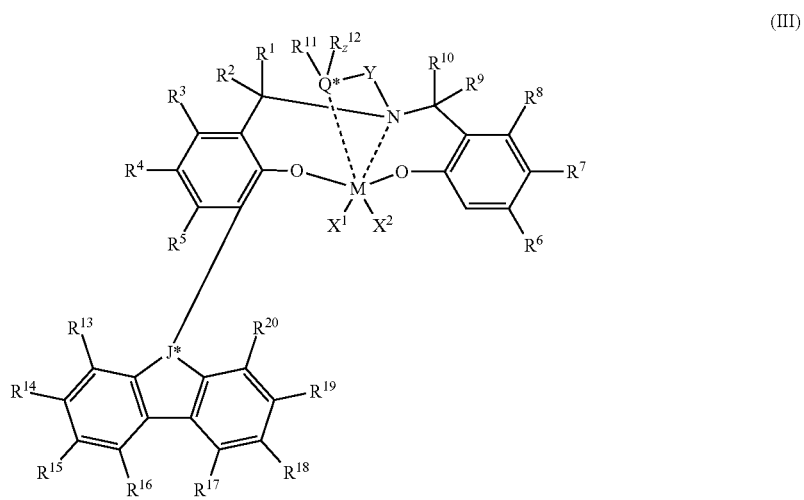

(III)

where M is Hf, Zr, or Ti. $X^1$, $X^2$, $R^1$, $R^2$, $R^3$, $R^4$, $R^5$, $R^6$, $R^7$, $R^8$, $R^9$, $R^{10}$, and Y are as defined for Formula (I). $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ is independently a hydrogen, $C_1$-$C_{40}$ hydrocarbyl, $C_1$-$C_{40}$ substituted hydrocarbyl, a functional group comprising elements from Groups 13 to 17, or two or more of $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, and $R^{28}$ may independently join together to form a $C_4$-$C_{62}$ cyclic or polycyclic ring structure, or a combination thereof. $R^{11}$ and $R^{12}$ may join together to form a five- to eight-membered heterocycle. Q* is a group 15 or 16 atom, z is 0 or 1. J* is CR" or N, and G* is CR" or N, where R" is $C_1$-$C_{20}$ hydrocarbyl or carbonyl-containing $C_1$-$C_{20}$ hydrocarbyl. z=0 if Q* is a group 16 atom, and z=1 if Q* is a group 15 atom.

In at least one embodiment the catalyst is an iron complex represented by formula (IV):

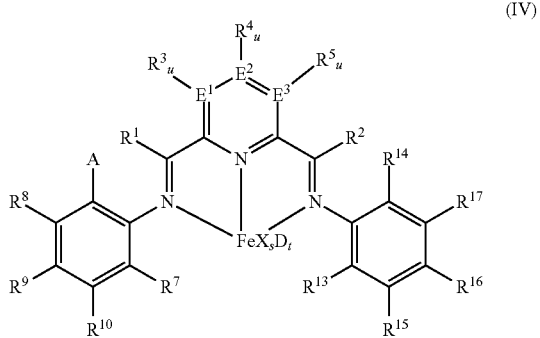

(IV)

wherein:
A is chlorine, bromine, iodine, —$CF_3$ or —$OR^{11}$,
each of $R^1$ and $R^2$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or five-, six- or seven-membered heterocyclyl comprising at least one atom selected from the group consisting of N, P, O and S;

wherein each of $R^1$ and $R^2$ is optionally substituted by halogen, $-NR^{11}{}_2$, $-OR^{11}$ or $-SiR^{12}{}_3$; wherein $R^1$ optionally bonds with $R^3$, and $R^2$ optionally bonds with $R^5$, in each case to independently form a five-, six- or seven-membered ring;

$R^7$ is a $C_1$-$C_{20}$ alkyl;

each of $R^3$, $R^4$, $R^5$, $R^8$, $R^9$, $R^{10}$, $R^{15}$, $R^{16}$, and $R^{17}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, $-NR''{}_2$, $-OR^{11}$, halogen, $-SiR^{12}{}_3$ or five-, six- or seven-membered heterocyclyl comprising at least one atom selected from the group consisting of N, P, O and S;

wherein $R^3$, $R^4$, $R^5$, $R^7$, $R^8$, $R^9$, $R^{10}$, $R^{15}$, $R^{16}$, and $R^{17}$ are optionally substituted by halogen, $-NR''{}_2$, $-OR^{11}$ or $-SiR^{12}{}_3$;

wherein $R^3$ optionally bonds with $R^4$, $R^4$ optionally bonds with $R^5$, $R^7$ optionally bonds with $R^{10}$, $R^{10}$ optionally bonds with $R^9$, $R^9$ optionally bonds with $R^8$, $R^{17}$ optionally bonds with $R^{16}$, and $R^{16}$ optionally bonds with $R^{15}$, in each case to independently form a five-, six- or seven-membered carbocyclic or heterocyclic ring, the heterocyclic ring comprising at least one atom from the group consisting of N, P, O and S;

$R^{13}$ is $C_1$-$C_{20}$-alkyl bonded with the aryl ring via a primary or secondary carbon atom, $R^{14}$ is chlorine, bromine, iodine, $-CF_3$ or $-OR^{11}$, or $C_1$-$C_{20}$-alkyl bonded with the aryl ring; each $R^{11}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or $-SiR^{12}{}_3$, wherein $R^{11}$ is optionally substituted by halogen, or two $R^{11}$ radicals optionally bond to form a five- or six-membered ring;

each $R^{12}$ is independently hydrogen, $C_1$-$C_{22}$-alkyl, $C_2$-$C_{22}$-alkenyl, $C_6$-$C_{22}$-aryl, arylalkyl where alkyl has from 1 to 10 carbon atoms and aryl has from 6 to 20 carbon atoms, or two $R^{12}$ radicals optionally bond to form a five- or six-membered ring, each of $E^1$, $E^2$, and $E^3$ is independently carbon, nitrogen or phosphorus;

each u is independently 0 if $E^1$, $E^2$, and $E^3$ is nitrogen or phosphorus and is 1 if $E^1$, $E^2$, and $E^3$ is carbon, each X is independently fluorine, chlorine, bromine, iodine, hydrogen, $C_1$-$C_{20}$-alkyl, $C_2$-$C_{10}$-alkenyl, $C_6$-$C_{20}$-aryl, arylalkyl where alkyl has from 1 to 10 carbon atoms and aryl has from 6 to 20 carbon atoms, $-NR^{18}{}_2$, $-OR^{18}$, $-SR^{18}$, $-SO_3R^{18}$, $-OC(O)R^{18}$, $-CN$, $-SCN$, β-diketonate, $-CO$, $-BF_4{}^-$, $-PF_6{}^-$ or bulky non-coordinating anions, and the radicals X can be bonded with one another;

each $R^{18}$ is independently hydrogen, $C_1$-$C_{20}$-alkyl, $C_2$-$C_{20}$-alkenyl, $C_6$-$C_{20}$-aryl, arylalkyl where alkyl has from 1 to 10 carbon atoms and aryl has from 6 to 20 carbon atoms, or $-SiR^{19}{}_3$, wherein $R^{18}$ can be substituted by halogen or nitrogen- or oxygen-containing groups and two $R^{18}$ radicals optionally bond to form a five- or six-membered ring;

each $R^{19}$ is independently hydrogen, $C_1$-$C_{20}$-alkyl, $C_2$-$C_{20}$-alkenyl, $C_6$-$C_{20}$-aryl or arylalkyl where alkyl has from 1 to 10 carbon atoms and aryl has from 6 to 20 carbon atoms, wherein $R^{19}$ can be substituted by halogen or nitrogen- or oxygen-containing groups or two $R^{19}$ radicals optionally bond to form a five- or six-membered ring;

s is 1, 2, or 3,

D is a neutral donor, and t is 0 to 2.

In at least one embodiment, the catalyst is a quinolinyl-diamido transition metal complex represented by formulas (V) and (VI):

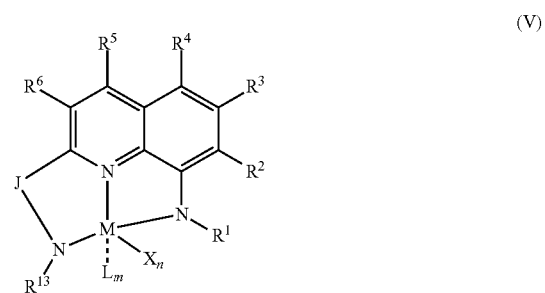

(V)

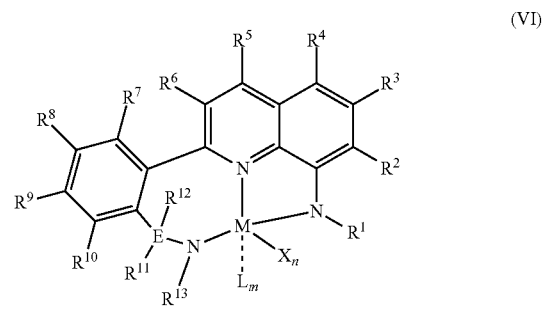

(VI)

wherein:

M is a Group 3-12 metal;

J is a three-atom-length bridge between the quinoline and the amido nitrogen;

E is selected from carbon, silicon, or germanium;

X is an anionic leaving group;

L is a neutral Lewis base;

$R^1$ and $R^{13}$ are independently selected from the group consisting of hydrocarbyls, substituted hydrocarbyls, and silyl groups;

$R^2$ through $R^{12}$ are independently selected from the group consisting of hydrogen, hydrocarbyls, alkoxy, silyl, amino, aryloxy, substituted hydrocarbyls, halogen, and phosphino;

n is 1 or 2;

m is 0, 1, or 2 n+m is not greater than 4; and any two adjacent R groups (e.g. $R^1$ & $R^2$, $R^2$ & $R^3$, etc.) may be joined to form a substituted or unsubstituted hydrocarbyl or heterocyclic ring, where the ring has 5, 6, 7, or 8 ring atoms and where substitutions on the ring can join to form additional rings;

any two X groups may be joined together to form a dianionic group;

any two L groups may be joined together to form a bidentate Lewis base;

an X group may be joined to an L group to form a monoanionic bidentate group.

In at least one embodiment M is a Group 4 metal, zirconium or hafnium;

In at least one embodiment J is an arylmethyl, dihydro-1H-indenyl, or tetrahydronaphthalenyl group;

In at least one embodiment E is carbon;

In at least one embodiment X is alkyl, aryl, hydride, alkylsilane, fluoride, chloride, bromide, iodide, triflate, carboxylate, or alkylsulfonate;

In at least one embodiment L is an ether, amine or thioether;

In at least one embodiment, $R^7$ and $R^8$ are joined to form a six membered aromatic ring with the joined $R^7R^8$ group being —CH=CHCH=CH—;

In at least one embodiment $R^{10}$ and $R^{11}$ are joined to form a five membered ring with the joined $R^{10}$ and $R^{11}$ groups being —$CH_2CH_2$—;

In at least one embodiment, $R^{10}$ and $R^{11}$ are joined to form a six membered ring with the joined $R^{10}$ and $R^{11}$ groups being —$CH_2CH_2CH_2$—.

In at least one embodiment, $R^1$ and $R^{13}$ may be independently selected from phenyl groups that are variously substituted with between zero to five substituents that include F, Cl, Br, I, $CF_3$, $NO_2$, alkoxy, dialkylamino, aryl, and alkyl groups having 1 to 10 carbons, such as methyl, ethyl, propyl, butyl, pentyl, hexyl, heptyl, octyl, nonyl, decyl, and isomers thereof.

In some embodiments, the catalyst is a phenoxyimine compound represented by the formula (VII):

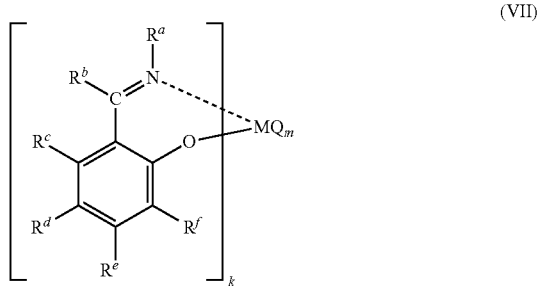

(VII)

wherein M represents a transition metal atom selected from the groups 3 to 11 metals in the periodic table; k is an integer of 1 to 6; m is an integer of 1 to 6; $R^a$ to $R^f$ may be the same or different from one another and each represent a hydrogen atom, a halogen atom, a hydrocarbon group, a heterocyclic compound residue, an oxygen-containing group, a nitrogen-containing group, a boron-containing group, a sulfur-containing group, a phosphorus-containing group, a silicon-containing group, a germanium-containing group or a tin-containing group, among which 2 or more groups may be bound to each other to form a ring; when k is 2 or more, $R^a$ groups, $R^b$ groups, $R^c$ groups, $R^d$ groups, $R^e$ groups, or $R^f$ groups may be the same or different from one another, one group of $R^a$ to $R^f$ contained in one ligand and one group of $R^a$ to $R^f$ contained in another ligand may form a linking group or a single bond, and a heteroatom contained in $R^a$ to $R^f$ may coordinate with or bind to M; m is a number satisfying the valence of M; Q represents a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group; when m is 2 or more, a plurality of groups represented by Q may be the same or different from one another, and a plurality of groups represented by Q may be mutually bound to form a ring.

In another embodiment, the catalyst is a bis(imino)pyridyl of the formula (VIII):

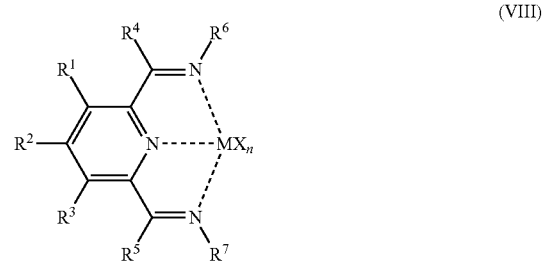

(VIII)

wherein:

M is Co or Fe; each X is an anion; n is 1, 2 or 3, so that the total number of negative charges on said anion or anions is equal to the oxidation state of a Fe or Co atom present in (VIII);

$R^1$, $R^2$ and $R^3$ are each independently hydrogen, hydrocarbyl, substituted hydrocarbyl, or an inert functional group;

$R^4$ and $R^5$ are each independently hydrogen, hydrocarbyl, an inert functional group or substituted hydrocarbyl;

$R^6$ is formula (IX):

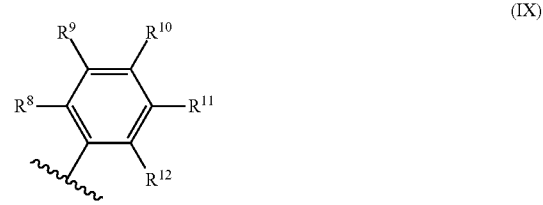

(IX)

and $R^7$ is formula (X):

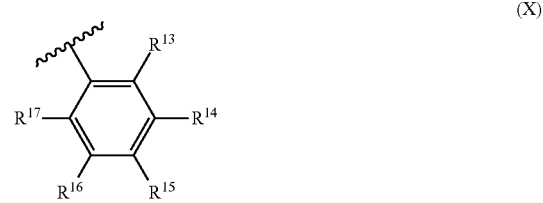

(X)

$R^8$ and $R^{13}$ are each independently hydrocarbyl, substituted hydrocarbyl or an inert functional group;

$R^9$, $R^{10}$, $R^{11}$, $R^{14}$, $R^{15}$ and $R^{16}$ are each independently hydrogen, hydrocarbyl, substituted hydrocarbyl or an inert functional group;

$R^{12}$ and $R^{17}$ are each independently hydrogen, hydrocarbyl, substituted hydrocarbyl or an inert functional group;

and provided that any two of $R^8$, $R^9$, $R^{10}$, $R^{11}$, $R^{12}$, $R^{13}$, $R^{14}$, $R^{15}$, $R^{16}$ and $R^{17}$ that are adjacent to one another, together may form a ring.

In at least one embodiment, the catalyst compound is represented by the formula (XI):

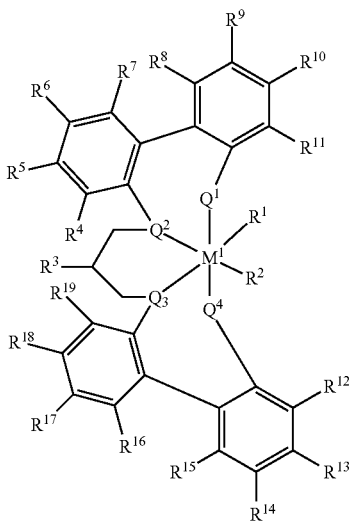

(XI)

$M^1$ is selected from the group consisting of titanium, zirconium, hafnium, vanadium, niobium, tantalum, chromium, molybdenum and tungsten. In at least one embodiment, $M^1$ is zirconium. Each of $Q^1$, $Q^2$, $Q^3$, and $Q^4$ is independently oxygen or sulfur. In at least one embodiment, at least one of $Q^1$, $Q^2$, $Q^3$, and $Q^4$ is oxygen, alternately all of $Q^1$, $Q^2$, $Q^3$, and $Q^4$ are oxygen.

$R^1$ and $R^2$ are independently hydrogen, halogen, hydroxyl, hydrocarbyl, or substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). $R^1$ and $R^2$ can be a halogen selected from fluorine, chlorine, bromine, or iodine. In at least one embodiment, $R^1$ and $R^2$ are chlorine.

Alternatively, $R^1$ and $R^2$ may also be joined together to form an alkanediyl group or a conjugated $C_4$-$C_{40}$ diene ligand which is coordinated to $M^1$. $R^1$ and $R^2$ may also be identical or different conjugated dienes, optionally substituted with one or more hydrocarbyl, tri(hydrocarbyl) silyl or tri(hydrocarbyl) silylhydrocarbyl, the dienes having up to 30 atoms not counting hydrogen and/or forming a π-complex with $M^1$.

Exemplary groups suitable for $R^1$ and or $R^2$ can include 1,4-diphenyl, 1,3-butadiene, 1,3-pentadiene, 2-methyl 1,3-pentadiene, 2,4-hexadiene, 1-phenyl, 1,3-pentadiene, 1,4-dibenzyl, 1,3-butadiene, 1,4-ditolyl-1,3-butadiene, 1,4-bis (trimethylsilyl)-1,3-butadiene, and 1,4-dinaphthyl-1,3-butadiene. $R^1$ and $R^2$ can be identical and are $C_1$-$C_3$ alkyl or alkoxy, $C_6$-$C_{10}$ aryl or aryloxy, $C_2$-$C_4$ alkenyl, $C_7$-$C_{10}$ arylalkyl, $C_7$-$C_{12}$ alkylaryl, or halogen.

Each of $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, and $R^{19}$ is independently hydrogen, halogen, $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen), $-NR'_2$, $-SR'$, $-OR$, $OSiR'_3$, $-PR'_2$, where each R' is hydrogen, halogen, $C_1$-$C_{10}$ alkyl, or $C_6$-$C_{10}$ aryl, or one or more of $R^4$ and $R^5$, $R^5$ and $R^6$, $R^6$ and $R^7$, $R^8$ and $R^9$, $R^9$ and $R^{10}$, $R^{10}$ and $R^{11}$, $R^{12}$ and $R^{13}$, $R^{13}$ and $R^{14}$, $R^{14}$ and $R^{15}$, $R^{16}$ and $R^{17}$, $R^{17}$ and $R^{18}$, and $R^{18}$ and $R^{19}$ are joined to form a saturated ring, unsaturated ring, substituted saturated ring, or substituted unsaturated ring. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^{11}$ and $R^{12}$ are $C_6$-$C_{10}$ aryl such as phenyl or naphthyl optionally substituted with $C_1$-$C_{40}$ hydrocarbyl, such as $C_1$-$C_{10}$ hydrocarbyl. In at least one embodiment, $R^6$ and $R^{17}$ are $C_{1\text{-}40}$ alkyl, such as $C_1$-$C_{10}$ alkyl.

In at least one embodiment, each of $R^4$, $R^5$, $R^6$, $R^7$, $R^8$, $R^9$, $R^{10}$, $R^{13}$, $R^{14}$, $R^{15}$, $R^{16}$, $R^{17}$, $R^{18}$, and $R^{19}$ is independently hydrogen or $C_1$-$C_{40}$ hydrocarbyl. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl. In at least one embodiment, each of $R^6$ and $R^{17}$ is $C_1$-$C_{40}$ hydrocarbyl and $R^4$, $R^5$, $R^7$, $R^8$, $R^9$, $R^{10}$, $R^{13}$, $R^{14}$, $R^{15}$, $R^{16}$, $R^{18}$, and $R^{19}$ is hydrogen. In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

$R^3$ is a $C_1$-$C_{40}$ unsaturated alkyl or substituted $C_1$-$C_{40}$ unsaturated alkyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen).

In at least one embodiment, $R^3$ is a hydrocarbyl comprising a vinyl moiety. As used herein, "vinyl" and "vinyl moiety" are used interchangeably and include a terminal alkene, e.g. represented by the structure,

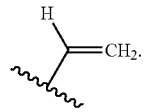

Hydrocarbyl of $R^3$ may be further substituted (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri (hydrocarbyl) silyl or tri(hydrocarbyl) silylhydrocarbyl, the diene having up to 30 atoms other than hydrogen). In at least one embodiment, $R^3$ is $C_1$-$C_{40}$ unsaturated alkyl that is vinyl or substituted $C_1$-$C_{40}$ unsaturated alkyl that is vinyl. $R^3$ can be represented by the structure $-\text{R'CH}=\text{CH}_2$ where R' is $C_1$-$C_{40}$ hydrocarbyl or $C_1$-$C_{40}$ substituted hydrocarbyl (such as $C_1$-$C_{10}$ alkyl, $C_1$-$C_{10}$ alkoxy, $C_6$-$C_{20}$ aryl, $C_6$-$C_{10}$ aryloxy, $C_2$-$C_{10}$ alkenyl, $C_2$-$C_{40}$ alkenyl, $C_7$-$C_{40}$ arylalkyl, $C_7$-$C_{40}$ alkylaryl, $C_8$-$C_{40}$ arylalkenyl, or conjugated diene which is optionally substituted with one or more hydrocarbyl, tri(hydrocarbyl) silyl or tri(hydrocarbyl) silylhydrocarbyl, the diene having up to 30 atoms other than hydrogen). In at least one embodiment, $C_1$-$C_{40}$ hydrocarbyl is selected from methyl, ethyl, propyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, sec-octyl, n-nonyl, isononyl, sec-nonyl, n-decyl, isodecyl, and sec-decyl.

In at least one embodiment, $R^3$ is 1-propenyl, 1-butenyl, 1-pentenyl, 1-hexenyl, 1-heptenyl, 1-octenyl, 1-nonenyl, or 1-decenyl.

In at least one embodiment, the catalyst is a Group 15-containing metal compound represented by Formulas (XII) or (XIII):

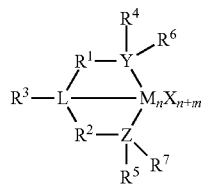

(XII)

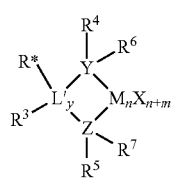

(XIII)

wherein M is a Group 3 to 12 transition metal or a Group 13 or 14 main group metal, a Group 4, 5, or 6 metal. In some embodiments, M is a Group 4 metal, such as zirconium, titanium, or hafnium. Each X is independently a leaving group, such as an anionic leaving group. The leaving group may include a hydrogen, a hydrocarbyl group, a heteroatom, a halogen, or an alkyl; y is 0 or 1 (when y is 0 group L' is absent). The term 'n' is the oxidation state of M. In various embodiments, n is +3, +4, or +5. In some embodiments, n is +4. The term 'm' represents the formal charge of the YZL or the YZL' ligand, and is 0, −1, −2 or −3 in various embodiments. In some embodiments, m is −2. L is a Group 15 or 16 element, such as nitrogen or oxygen; L' is a Group 15 or 16 element or Group 14 containing group, such as carbon, silicon or germanium. Y is a Group 15 element, such as nitrogen or phosphorus. In some embodiments, Y is nitrogen. Z is a Group 15 element, such as nitrogen or phosphorus. In some embodiments, Z is nitrogen. $R^1$ and $R^2$ are, independently, a $C_1$ to $C_{20}$ hydrocarbon group, a heteroatom containing group having up to twenty carbon atoms, silicon, germanium, tin, lead, or phosphorus. In some embodiments, $R^1$ and $R^2$ are a $C_2$ to $C_{20}$ alkyl, aryl or aralkyl group, such as a $C_2$ to $C_{20}$ linear, branched or cyclic alkyl group, or a $C_2$ to $C_{20}$ hydrocarbon group. $R^1$ and $R^2$ may also be interconnected to each other. $R^3$ may be absent or may be a hydrocarbon group, a hydrogen, a halogen, a heteroatom containing group. In some embodiments, $R^3$ is absent, for example, if L is an oxygen, or a hydrogen, or a linear, cyclic, or branched alkyl group having 1 to 20 carbon atoms. $R^4$ and $R^5$ are independently an alkyl group, an aryl group, substituted aryl group, a cyclic alkyl group, a substituted cyclic alkyl group, a cyclic aralkyl group, a substituted cyclic aralkyl group, or multiple ring system, often having up to 20 carbon atoms. In some embodiments, $R^4$ and $R^5$ have between 3 and 10 carbon atoms, or are a $C_1$ to $C_{20}$ hydrocarbon group, a $C_1$ to $C_{20}$ aryl group or a $C_1$ to $C_{20}$ aralkyl group, or a heteroatom containing group. $R^4$ and $R^5$ may be interconnected to each other. $R^6$ and $R^7$ are independently absent, hydrogen, an alkyl group, halogen, heteroatom, or a hydrocarbyl group, such as a linear, cyclic or branched alkyl group having 1 to 20 carbon atoms. In some embodiments, $R^6$ and $R^7$ are absent. $R^*$ may be absent, or may be a hydrogen, a Group 14 atom containing group, a halogen, or a heteroatom containing group.

By "formal charge of the YZL or YZL' ligand," it is meant the charge of the entire ligand absent the metal and the leaving groups X. By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups. An alkyl group may be linear, branched alkyl radicals, alkenyl radicals, alkynyl radicals, cycloalkyl radicals, aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof. An aralkyl group is defined to be a substituted aryl group.

In one or more embodiments, $R^4$ and $R^5$ are independently a group represented by the following structure (XIV):

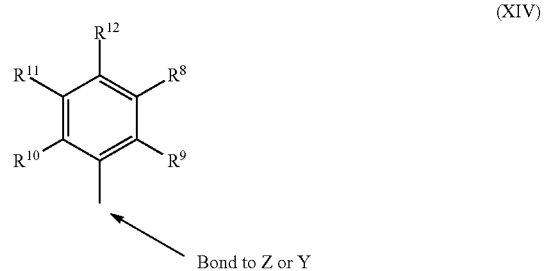

(XIV)

Bond to Z or Y wherein $R^8$ to $R^{12}$ are each independently hydrogen, a $C_1$ to $C_{40}$ alkyl group, a halide, a heteroatom, a heteroatom containing group containing up to 40 carbon atoms. In some embodiments, $R^8$ to $R^{12}$ are a $C_1$ to $C_{20}$ linear or branched alkyl group, such as a methyl, ethyl, propyl, or butyl group. Any two of the R groups may form a cyclic group and/or a heterocyclic group. The cyclic groups may be aromatic. In one embodiment $R^9$, $R^{10}$ and $R^{12}$ are independently a methyl, ethyl, propyl, or butyl group (including all isomers). In another embodiment, $R^9$, $R^{10}$ and $R^{12}$ are methyl groups, and $R^8$ and $R^{11}$ are hydrogen.

In one or more embodiments, $R^4$ and $R^5$ are both a group represented by the following structure (XV):

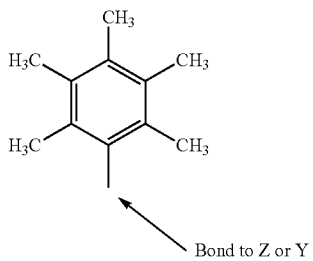

(XV)

wherein M is a Group 4 metal, such as zirconium, titanium, or hafnium. In some embodiments, M is zirconium. Each of L, Y, and Z may be a nitrogen. Each of $R^1$ and $R^2$ may be —$CH_2$—$CH_2$—. $R^3$ may be hydrogen, and $R^6$ and $R^7$ may be absent.

In some embodiments, the maximum amount of alumoxane is up to a 5000-fold molar excess Al/M over the catalyst compound (per metal catalytic site). The minimum alumoxane-to-catalyst-compound is a 1:1 molar ratio. Alternate ranges include from 1:1 to 500:1, alternately from 1:1 to 200:1, alternately from 1:1 to 100:1, or alternately from 1:1 to 50:1.

Other catalysts for use in processes of the present disclosure include "non-metallocene complexes" that are defined to be transition metal complexes that do not feature a cyclopentadienyl anion or substituted cyclopentadienyl anion donors (e.g., cyclopentadienyl, fluorenyl, indenyl, methylcyclopentadienyl). Examples of families of non-metallocene complexes that may be suitable can include late transition metal pyridylbisimines (e.g., U.S. Pat. No. 7,087,686), group 4 pyridyldiamidos (e.g., U.S. Pat. No. 7,973,116), quinolinyldiamidos (e.g., U.S. Pub. No. 2018/0002352 A1), pyridylamidos (e.g., U.S. Pat. No. 7,087,690), phenoxyimines (e.g., Accounts of Chemical Research 2009, 42, 1532-1544), and bridged bi-aromatic complexes (e.g., U.S. Pat. No. 7,091,292), the disclosures of which are incorporated herein by reference.

CA Composition

Methods of the present disclosure allow reactor production rates to be increased as compared to addition of CAs or CA compositions used previously (e.g., by changing the CAs in the CA composition), while avoiding the conditions in the reactor that may lead to excessive stickiness or the formation of liquids in the reactor. These methods use available processes and may be implemented at plant sites either on-line, in process control systems, or off-line (e.g., using spreadsheets, databases, or application specific programs).

Increasing productivity of the polymerization process may be achieved by controlling the relative concentrations of two or more CAs in the reactor (i.e., a mole percent of a CA relative to total reactor gas, which may be derived from the partial pressure of each relative to the total pressure in the reactor). The concentrations of the two or more CAs may be altered according to a relationship of the total allowable CA composition, the SL of a first condensing agent (in a gas composition having a single CA) ($SL_{CA1}$), and the equivalence factor relating the first CA and additional CA(s).

Total Allowable Condensing Agent Composition

A fluidized bed process is performed where the velocity of the gaseous recycle stream is sufficient to maintain the reaction zone in a fluidized state. In a fluidized bed polymerization process, the amount of fluid circulated to remove the heat of polymerization may be greater than the amount of fluid needed for support of the fluidized bed and for adequate mixing of the solids in the fluidized bed. The excess velocity provides additional gas flow to (and through) the fluid bed for additional cooling capacity and more intensive mixing of the reactor bed. However, to prevent excessive entrainment of solids in a gaseous stream withdrawn from the fluidized bed, the velocity of the gaseous stream may be regulated.

A fluidized bed within a gas phase reactor may include reactive components, other reagents (anti-slip, anti-static), and inert components including inert gas and CAs. The combination of all these components can make up 100% of the flow (e.g., of volume or mass balance) of gas in and through a gas phase reactor. The total allowable CA composition (Z) is the amount of the combination of CAs that is subject to the concentration of other components in the fluidized bed.

Therefore, in order to increase Z, a portion of another component of the gas stream may be decreased. An increase in Z may allow for greater cooling of the reactor and therefore increased production rates, but is limited by reactor volume and venting. Substantially all (e.g., 100%) of the components entering the reactor leave the reactor either in the product stream or the recycle stream. Z is increased by decreasing another component. For example, an increase in Z may be accomplished by lower quantities of other inert compounds including nitrogen. Alternatively, Z may be increased by using monomer and comonomer feeds with fewer inert impurities, a higher purity feed may allow for increased addition of CA composition.

The ratio of inert components can be varied, but may be limited by reactor venting. In order to maintain the mass balance for a given inert gas concentration, the inert gas flow into the reactor must equal the inert gas vented from the reactor. Reducing the concentration of inert gas in the reactor may result in more total vent flow. An increased vent flow may result in greater material loss and may also be limited by reactor design. For a given reactor producing a particular grade of polyolefin, the minimum inert gas can be ascertained based on a cost analysis balancing the reactor design including limits on vent flow and raw material loss associated with increased production rates related to improved cooling from a greater quantity of CA composition. Because the reactive components and other components that aid in product formation may be specific to one embodiment of a desired product, they may be kept constant. Alternatively, Z may be increased by lowering the concentration of monomers or comonomers. Without being limited by theory, reduction of pressures of monomer and comonomer may decrease the catalyst activity, but it is possible that the cost associated with a decrease in catalyst activity is overcome by the improved production rates that accompany increased cooling from additional Z.

Furthermore, Z may be increased by increasing the overall reactor pressure. For example, if the individual components are at a specific partial pressure increasing the total pressure in the reactor would therefore increase pressure available to a CA composition. An increase in pressure of the reactor may be limited by reactor design, feedstock pressures and compression costs, changes in the solubility and stickiness of the products and reactants. Therefore, the total allowable CA composition may be a cost benefit analysis of individual options for increasing Z including, but not limited to removal of portions of other components or reactor pressurization. The cost analysis may take into account many factors including the catalyst activity, feedstock purity and availability, reactor design (in pressure, volume, and venting), product grades, and flow rates sufficient to fluidize the bed. The cost of any of these factors may be balanced by increased production rate resulting from improved cooling due to additional volume (or pressure) allotted to CA composition.

Stick Limit

There may be limits to the concentrations of condensable gases, whether CAs, comonomers or combinations thereof, that can be tolerated in the reaction system. Above certain limiting concentrations, the condensable gases can cause a sudden loss of fluidization in the reactor, and a consequent loss in ability to control the temperature in the fluid bed. The loss of fluidization is indicative of the stick limit (SL). The SL is the limit of CA in a CA composition having a single CA, in a gas phase reactor under certain conditions. The SL for a specific CA may be ascertained by a laboratory method or through computational methods.

A suitable laboratory method for determining SL is described in U.S. Pat. No. 10,029,226, incorporated by reference. The method estimates SL by measuring stirrer rotations per minute in an autoclave as the temperature is increased. As the mixture becomes overly sticky the stirrer stops at a certain temperature. The test can be performed at varying levels of the condensing agent and the stickiness temperature correlated to the SL as a linear function. The stick limit of a particular grade of polyolefin is therefore calculated as a linear function of multiple laboratory tests determining stickiness temperature.

Another suitable laboratory method for determining stickiness and SL is described in U.S. Pat. No. 8,273,834, incorporated by reference. The method describes the use of melting point depression to determine stickiness, using differential scanning calorimetry and a prediction of reaction mixture solubility in polyethylene. The SL can be calculated by determining the difference between the reaction temperature and the melt initiation temperature of the polyolefin reaction mixture, also known as the change in melt initiation temperature (AMIT). The AMIT is an indication of how far the reaction temperature is into a DSC melt curve at reactor conditions.

A suitable computational method is based on modeling phase behavior in polymer mixtures. Modeling phase behavior in polymer mixtures may present a number of complexities. The complexities in modeling phase behavior may derive from distributions in molecular weight and composition of industrially produced polymers, the tendency for some of the polymer chains to crystallize in a high density state (while others remain amorphous) at low temperatures, and the inaccessibility of crystalline domains in absorbing solutes. Equilibrium thermodynamic models calculate solubility in the amorphous phase, as they are based on equilibrium between species in solution with the polymer (e.g. within the amorphous phase, and not the crystalline phase, as stated above) and those same species in a coexisting phase. Therefore, a clear distinction between total ($x_{wi}^T$) and amorphous ($x_{wi}^T$) solubility, and perhaps a statement of the crystallinity (C) itself, is involved in the comparison of experimental and theoretical values. These are related by equation (E-1):

$$x_{wi}^T = \frac{x_{wi}^A}{1 + \frac{Cx_{wa}^A}{(1-C)}} \quad (E-1)$$

where $x_{wi}$ is the mass fraction of species i; the ratio of the mass of species i absorbed to the sum of the mass of species i and the mass of polymer. Superscript A represents the case where only the amorphous mass of the polymer is considered, while the superscript T represents the case where the total mass of the polymer is considered. $x_{wa}^A$ is the mass fraction of the polymer on an amorphous basis, and C is the crystallinity as a mass fraction; the ratio of the mass of crystalline polymer to the total mass of the polymer.

Simply accounting for such a basis of solubility is not sufficient, as the presence of crystalline polymers (or more specifically the tie chains connecting them) may affect the quantity of solute that can absorb within the amorphous phase of the polymer. One method to account for this is to apply an activity coefficient accounting for the effects of such tie chains as in equation (E-2):

$$y_i \hat{\varphi}_i^V = x_i^A \gamma_i^A \hat{\varphi}_i^{Ref} \quad (E-2)$$

where 'V' represents vapor and 'A' represents the mixture of amorphous polymer and the absorbed species, $y_i$ and $x_i$ are the mole fraction compositions of these respective phases. $\hat{\varphi}_i^V$ is the fugacity coefficient of species i in the vapor phase, while $\hat{\varphi}_i^{Ref}$ is the fugacity coefficient of a species in an amorphous phase free from elastic constraints. $\gamma_i^A$ accounts for the effects of the elastic constraints on the fugacity coefficient of a species in an amorphous phase, and hence the solubility.

The Sako-Wu-Prausnitz Equation Of State (SWP-EOS) may be used as it is a simple cubic EOS applicable to both small (volatile) molecules and polymers as shown in equation (E-3):

$$P = \frac{RT(v + b\{c - 1\})}{v(v - b)} - \frac{a}{v(v + b)} \quad (E-3)$$

where P is the pressure, T is the absolute temperature, v is the molar volume, R is the universal gas constant, and a, b, and c are the attractive, repulsive and degree-of-freedom parameters of the mixture under consideration.

The expression for the SWP-EOS fugacity coefficients is calculated as in equation (E-4):

$$\ln[\hat{\varphi}_i] = -c_i \ln\left[\frac{Z - B}{Z}\right] + c\frac{B_i}{(Z - B)} - \frac{A}{B}\left\{\frac{2\sum_m^{Comps} A_{im}x_m}{A} - \frac{B_i}{B}\right\}\ln\left[\frac{Z + B}{Z}\right] - \frac{A}{B}\frac{B_i}{(Z + B)} - \ln[Z] \quad (E-4)$$

where, beyond the definitions in context with equation (E-3), $a_i$, $b_i$ and $c_i$ are the attractive, repulsive and degree-of-freedom parameters of species i, while $$B_i = \frac{b_i P}{RT}.$$

The mixture parameters are calculated via $$A_{mn} = \frac{a_{mn}P}{(RT)^2}, a_{mn} = \sqrt{a_m a_n}(1 - K_{mn}).$$

with $K_{mn}$ being the binary interaction parameters for the components in the mixture, $a=\Sigma_m\Sigma_n a_{mn}$, $b=\Sigma_m b_m$, and $$A = \frac{aP}{(RT)^2}, B = \frac{bP}{RT}, \text{ and } Z = \frac{Pv}{RT}.$$

The symbol 'x' in equation (E-4) represents mole fraction in general; either that of the vapor (y) or the polymer containing mixture (x) can be used.

For a more accurate determination of solubility there is an elastic correction where the activity coefficient is as discussed by Serna et al. *J. Appl. Polym. Sci.* 2008, 107, 138 and Banaszak et al. *Macromolecules* 2004, 37, 9139 and is represented by equation (E-5):

$$\ln[\gamma_i^{el}] = \frac{\frac{\Delta h_{poly}^{fus}\overline{v}_i}{R\overline{v}_{poly}}\left(\frac{1}{T}-\frac{1}{T_m}\right)-(\phi_i-\chi_i\phi_i^2)}{\frac{3}{2f\phi_{poly}}-1} \quad (E\text{-}5)$$

where:
$\Delta h_{poly}^{fus}$=enthalpy of fusion of the polymer
$\overline{v}_k$=partial molar volume of species k in the amorphous phase
k=either 'i' or 'poly'
T=absolute temperature
$T_m$=absolute normal melting point of polymer
$\phi_k$=volume fraction of species k in the amorphous phase
$\chi_i$=Flory interaction parameter of species k in the amorphous phase, given by equation (E-6):

$$\chi_i = 0.34 + v_i^L \frac{(\delta_i - \delta_{poly})^2}{RT} \quad (E\text{-}6)$$

where $\delta_k$=solubility parameter, where k=either 'i' or 'poly', and where the solubility parameter is given for volatile species by equation (E-7), $$\delta_k = \sqrt{\frac{\Delta h_k^{vap} - RT}{v_k^L}} \quad (E\text{-}7)$$

while for polyethylene, $\delta_{poly}$ was approximated as 16.7 MPa^0.5, and f=fraction of elastically affected chains.

Given a vapor phase of fixed temperature, pressure and composition (y), the solubility can be determined by calculating the composition of the amorphous phase (x). The set of equations to be solved can consist of the statements of equilibrium and material balance. These are represented by equation (E-8) and equation (E-9):

$$E_i = \ln[y_i] + \ln[\hat{\varphi}_i^V] - \ln[n_i] - \ln[\hat{\varphi}_i^A] - \ln[\gamma_i^{el}] = 0, i \neq poly \quad (E\text{-}8)$$

$$MB = \Sigma_{s=1}^{Comps} n_s - 1 = 0 \quad (E\text{-}9)$$

As indicated, the unknowns in the model are the moles of substance dissolved in the polymer phase. The unknowns are to be considered 'mole numbers', which produce corresponding 'mole fractions'. The material balance equation, requiring unit sum of the dissolved mole numbers, reconciles these. The problem can be stated as an unconstrained optimization as in equation (E-10):

$$F[n] = \begin{bmatrix} E \\ MB \end{bmatrix} = \begin{bmatrix} 0 \\ 0 \end{bmatrix} \quad (E\text{-}10)$$

Initial estimates can be generated by setting $n_{poly}$~0.05, and $n_j$~$(1-n_{poly})y_{j \neq poly}$, which can subsequently be refined by Newton iteration; equations (E-11) and (E-12):

$$\Delta n_j = -H_{ij}^{-1} F_i \quad (E\text{-}11)$$

with:

$$H_{ij} = \left(\frac{\partial F_i}{\partial n_j}\right)_{T,P} \quad (E\text{-}12)$$

Mole fractions can be converted to mass fractions by using the number average molecular weight (Mn) of the polymer.

While the given model contains a large number of parameters, the majority can be estimated from literature or characterization data. Furthermore, accurate solubility predictions may be made after fitting two of the model parameters (f and $T_m$) to experimental data. Our method for parameterization is:

I. For a given polymer, a low and high temperature (typically 50° C. and 85° C., respectively) measured isopentane solubility isotherm are used to fit f and $T_m$ simultaneously.

II. Low pressure isopentane solubility isotherms are simulated for each of these polymers at pressures from about 0.01 bar to about 0.8 bar, and at temperatures from about 50° C. to about 90° C.

III. For each of these polymers, isopentane Henry constants were derived at the above temperatures according to equation (E-13):

$$Fy_iP = w_iH_i \quad (E\text{-}13)$$

The derived Henry constants allow for a determination of the slope of ln(H) vs. 1/T for each of these polymers.

IV. Using the median and standard deviation of the Henry constant slopes identified using the procedures of roman numerals I through III above for a range of polyethylenes, the following objective function was minimized with respect to f and $T_m$ for each polymer.

In other words, a method described identifies a target value of the isopentane Henry constant slope, and then adjusts f and $T_m$ to simultaneously match this target and one isopentane isotherm (85° C. or the highest value available) for that particular polymer. Instead of using two isotherms for each polymer, the target value of the Henry constant slope can be applied to polymers of a given type (e.g. C4 and C6 linear low density polyethylenes, (LLDPEs) produced in GPPE reactors), and only a single isotherm (unique to each polymer) is involved.

CA Equivalence Factor

The term "equivalence factor" refers to a mole to mole relationship of a first CA to a second CA where one mole of the first CA may be replaced with X moles of the second CA. To compare two CAs, the second CA is more volatile than the first CA. For example, in some embodiments, isopentane (less volatile than n-butane) and n-butane may have a CA equivalence factor of about 1.8 to about 2.5, which means that during polyolefin production, 1 mole of isopentane can be replaced with about 1.8 moles to about 2.5 moles of n-butane while maintaining the same stickiness temperature. Replacing a portion of isopentane with an equivalent amount of n-butane may increase cooling capacity without causing stickiness and therefore allow for increased production rate.

It may be possible to use simulations of the process at various reactor conditions to arrive at a ratio of CAs that will allow for high production rates. For example, suitable process simulations may be accomplished using commercial modelling software, such as PRO/II produced by SimSci™ or Aspen Plus produced by Aspentech. Each individual set of conditions takes time to prepare and model in a simulation. Therefore, using simulations to determine the ratio of CAs is not only costly and labor intensive, but could not readily be accomplished without substantial programming efforts in real-time as the reactor is running.

In some instances, the equivalence factor may be related to the solubility of a first CA in a polyolefin compared to the solubility of a second CA in the same polyolefin. Without being limited by theory, the stickiness of a polyolefin mixing with a CA composition within a gas phase reactor may be related to the solubility of the CA composition in the polyolefin. The solubility of a single CA in a polymer is not only affected by many reaction conditions (e.g. pressure, temperature, product density), but also affected by the presence of other CAs, additives, and reaction components. Because the stickiness of the polyolefin may limit production rate (because of the relationship between production and temperature), the CA composition is a balance of the ability to cool the reaction mixture and the solubility of the CA composition in the produced polyolefin.

The equivalence factor is calculated from individual solubilities of CAs in the polyolefin under reactor conditions. Because reactor conditions differ for different polyolefins and for different grades of a single polyolefin, and because reactor conditions vary with time, the solubilities and therefore the equivalence factor of two CAs will also vary. The variance in equivalence factors means that there would need to be either multitudinous lab experiments and/or computational studies performed in order to determine the equivalence factors related to reasonable reactor conditions for each polymer.

The equivalence factor of a first CA and a second CA at specific reactor conditions may be calculated by performing linear regression of the partial pressure versus the stickiness temperature of each individual CA and dividing the slopes of the lines. The calculation may be repeated for various reactor conditions including variance in temperature, pressure, reactant percentage and ratio of included comonomer. Once sufficient data is collected (either empirically or computationally), the various equivalence factors may be fit to a line to provide an equation that can be used to rapidly calculate the equivalence factor relating two condensing agents for a given polyolefin under a set of reactor conditions. The linear regression allows for the equivalence factor to be calculated in real time as reactor conditions change during the polymerization process being performed.

The linear regression of the equivalence factors may provide an equation relating reactor conditions and composition of the recycle gas to allow for calculation of equivalence factors as reactor conditions and gas composition changes. Also before changes are made in the gas composition such a linear regression allows for calculation of the changes in equivalence factors related to the changes in the gas composition, but at current reactor conditions. The linear regression of equivalence factors may include reactor conditions such as reactor temperature, reactor pressure, resin melt index, and resin density. The linear regression may also include factors related to the gas composition or recycle gas composition including mole fractions of the olefin monomer, comonomers, inert gases, and CAs or CA compositions.

Figure 4:
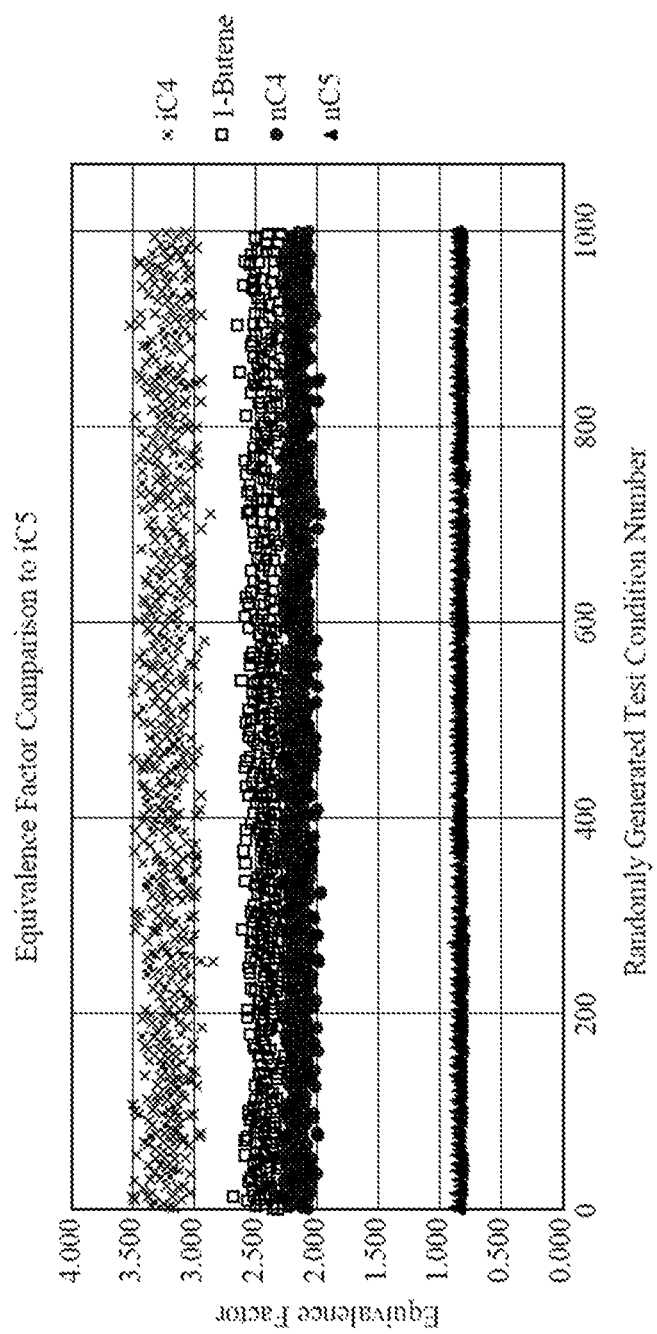
FIG. 4 is a plot of equivalence factors as determined by randomly generated test conditions, according to one embodiment.

FIG. 4 is a graph illustrating computation of equivalence factors of various C6-hydrocarbons in relation to iC5. The thermodynamic approximation of solubility used to calculate stickiness may be used to determine an equivalence factor for a random set of conditions.

Table 1 provides exemplary, non-limiting equivalence factors for various CA components.

TABLE 1

| CA | Equivalence Factor Relative to Isopentane |
|---|---|
| n-butane | about 1.8 to about 2.5 |
| isobutane | about 2.6 to about 3.8 |
| neo-pentane | about 1.5 to about 2 |
| n-pentane | about 0.7 to about 1 |
| n-hexane | about 0.2 to about 0.5 |

The concentration of the CA in the reactor (i.e., the mole percent of CA in the reactor or the sum of mole percent of each of the CA components as a function of total reactor gas) may change as the CA composition changes. For example, using a CA equivalence factor of 2 for n-butane:isopentane, the partial pressure of the CA in the reactor may increase as isopentane is replaced with n-butane to achieve a greater dew point approach temperature and higher polyolefin production rate. Using the same CA equivalence factor, in some instances, the reactor may have a maximum polyolefin production rate, which, if exceeded, may be reduced by replacing n-butane with isopentane, which would decrease the partial pressure of CA in the reactor. Alternatively, the concentration of CA in the reactor may not change as the CA composition changes.

In some embodiments, the partial pressure of CA in the reactor may be up to about 1400 kPa, such as about 30 kPa to about 1000 kPa, or about 100 kPa to about 700 kPa.

In some embodiments, the mole percent of an individual CA component relative to total reactor gas may be up to about 50 mol %, such as about 1 mol % to about 40 mol %, about 5 mol % to about 30 mol %, or about 10 mol % to about 20 mol %.

Calculating CA Composition

Once each of the factors related to the calculation of the ratio of condensing agents has been ascertained, then the SL of a first CA ($SL_{CA1}$) is subtracted from the total allowable CA (Z) and the result is divided by the equivalence factor relating a second CA to the first CA ($\alpha CA2$) less one. According to equation (E-14):

$$X = \frac{Z - SL_{CA1}}{\alpha CA2 - 1} \quad \text{(E-14)}$$

where X is a first amount of the first condensing agent removed and replaced by a second amount of the second condensing agent, where the second amount is X multiplied by $\alpha CA2$, Z is the total allowable condensing agent, $SL_{CA1}$ is the stick limit for the first condensing agent, and $\alpha CA2$ is the equivalence factor relating the first condensing agent and the second condensing agent. Because X represents the amount of CA1 that may be removed, X may not be less than zero or greater than $SL_{CA1}$. Because X is constrained in such a manner, if $SL_{CA1}$ is greater than the total allowable CA composition, no change in the CA composition occurs, and X is zero. Furthermore, the constraints on X mean that the equivalence factor may not be less than one, because X would be negative, and therefore the first CA must be less volatile than the second CA.

The linear regression of equivalence factors for a given combination of CAs allows for calculating in real time the CA composition that would allow for improved polymer production. The equations may be programmed into a control system that allows for adjustments of the reaction conditions as the information from the reactor is processed.

Without being limited by theory, the combination of two CAs in a binary CA composition may provide greater polymer production than the combination of more than two CAs. It may be beneficial to polymer production rates to reduce or eliminate inert gases not part of the binary CA composition. Also, the CAs within a binary CA composition that provides improved production may vary with reactor conditions and specifically with total allowable CA composition. When total allowable CA composition is lower, it may favor a CA composition with less volatile CAs, and as the total allowable CA composition increases, the binary CA composition that provides improved production may be a combination of more volatile CAs.

Polyolefin Products

This disclosure also relates to compositions of matter produced by the methods described.

In some embodiments, the methods described produce ethylene homopolymers or ethylene copolymers, such as ethylene-α-olefin (e.g. C3 to C20) copolymers (such as ethylene-butene copolymers, ethylene-hexene and/or ethylene-octene copolymers) having: a $M_w/M_n$, of greater than 1 to 4, or greater than 1 to 3.

Likewise, the processes of this disclosure produce ethylene copolymers. In some embodiments, the polyolefin copolymers produced have from about 0 mol % to about 25 mol %, from about 0.5 mol % to about 20 mol %, from about 1 mol % to about 15 mol %, or from about 3 mol % to about 10 mol % of one or more $C_3$ to $C_{20}$ olefin comonomer. The one or more $C_3$ to C20 olefin comonomer may include $C_3$ to $C_{12}$ alpha-olefin, such as propylene, butene, hexene, octene, decene, or dodecene.

In some embodiments, the monomer is ethylene and the comonomer is hexene, for example, from about 1 mol % to about 15 mol % hexene, such as about 1 mol % to about 10 mol %.

In at least one embodiment, the ethylene polymer composition is produced having: i) at least 50 mol % ethylene; ii) a density of 0.89 g/cc or more, such as 0.918 g/cc or more, or 0.935 g/cc or more; and a g'vis of about 0.97 or greater.

In some embodiments, the polymers produced have an $M_w$ of 5,000 g/mol to 1,000,000 g/mol, such as 25,000 g/mol to 750,000 g/mol, or 50,000 to 500,000 g/mol, and/or an $M_w/M_n$, of greater than 1 to about 40, such as about 1.2 to about 20, about 1.3 to about 10, about 1.4 to about 5, about 1.5 to about 4, or about 1.5 to about 3.

In at least one embodiment, the polymer produced has a unimodal or multimodal molecular weight distribution as determined by Gel Permeation Chromatography (GPC). By "unimodal" is meant that the GPC trace has one peak or inflection point. By "multimodal" is meant that the GPC trace has at least two peaks or inflection points. An inflection point is that point where the second derivative of the curve changes in from negative to positive or vice versa.

In at least one embodiment, the polymer produced has a bimodal molecular weight distribution as determined by Gel Permeation Chromatography (GPC). By "bimodal" is meant that the GPC trace has two peaks or inflection points.

Unless otherwise indicated modality, $M_w$, $M_n$, $M_z$, MWD, g value and g'$_{vis}$ are determined by using a High Temperature Size Exclusion Chromatograph (either from Waters Corporation or Polymer Laboratories), which may be equipped with a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001). The various transfer lines, columns and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turned on 1 to 1.5 hours before running the samples. The concentration, c, at each point in the chromatogram is calculated from the baseline-subtracted DRI signal, $I_{DRI}$, using equation (E-15):

$$c = K_{DRI} I_{DRI}/(dn/dc) \qquad (E-15)$$

where $K_{DRI}$ is a constant determined by calibrating the DRI, and (dn/dc) is the refractive index increment for the system. For, the refractive index, n=1.500 for TCB at 145° C. and λ=690 nm. For purposes of this disclosure (dn/dc)=0.104 for propylene polymers, 0.098 for butene polymers and 0.1 otherwise. Units on parameters throughout this description of the SEC method are such that concentration is expressed in g/cm³, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering of equation (E-16) (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c \qquad (E\text{-}16)$$

where, $\Delta R(\theta)$ is the measured excess Rayleigh scattering intensity at scattering angle θ, c is the polymer concentration determined from the DRI analysis, $A_2$ is the second virial coefficient [for purposes of this disclosure, $A_2$=0.0006 for propylene polymers, 0.0015 for butene polymers and 0.001 otherwise], (dn/dc)=0.104 for propylene polymers, 0.098 for butene polymers and 0.1 otherwise, P(θ) is the form factor for a monodisperse random coil, and $K_o$ is the optical constant for the system in equation (E-17):

$$K_o = \frac{4\pi^2 n^2 (dn/dc)^2}{\lambda^4 N_A} \quad \text{(E-17)}$$

where $N_A$ is Avogadro's number, and (dn/dc) is the refractive index increment for the system. For the refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, [η], at each point in the chromatogram is calculated from equation (E-18):

$$\eta_s = c[\eta] + 0.3(c[\eta])^2 \quad \text{(E-18)}$$

where c is concentration and was determined from the DRI output.

The branching index ($g'_{vis}$) is calculated using the output of the above SEC-DRI-LS-VIS method as follows. The average intrinsic viscosity, $[\eta]_{avg}$, of the sample is calculated by equation (E-19):

$$[\eta]_{avg} = \frac{\sum c_i [\eta]_i}{\sum c_i} \quad \text{(E-19)}$$

where the summations are over the chromatographic slices, i, between the integration limits. The branching index g'vis is defined in equation (E-20):

$$g'vis = \frac{[\eta]_{avg}}{kM_v^\alpha} \quad \text{(E-20)}$$

where, for purpose of this disclosure, α=0.695 and k=0.000579 for linear ethylene polymers, α=0.705 k=0.000262 for linear propylene polymers, and α=0.695 and k=0.000181 for linear butene polymers. $M_v$ is the viscosity-average molecular weight based on molecular weights determined by LS analysis.

In at least one embodiment, the polymer produced has a composition distribution breadth index (CDBI) of 50% or more, such as 60% or more, or 70% or more. CDBI is a measure of the composition distribution of monomer within the polymer chains and is measured by the procedure described in PCT publication WO 93/03093, published Feb. 18, 1993, specifically columns 7 and 8 as well as in Wild et al, J. Poly. Sci., Poly. Phys. Ed., Vol. 20, p. 441 (1982) and U.S. Pat. No. 5,008,204, including that fractions having a weight average molecular weight ($M_w$) below 15,000 are ignored when determining CDBI.

In another embodiment, the polymer produced has two peaks in the TREF measurement (see below). Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. In some embodiments, the two distinct peaks are at least 3° C. apart, at least 4° C. apart, or at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). An alternate method for TREF measurement can be used if the method below does not show two peaks, i.e., see B. Monrabal, "Crystallization Analysis Fractionation: A New Technique for the Analysis of Branching Distribution in Polyolefins," Journal of Applied Polymer Science, Vol. 52, 491-499 (1994).

TREF Method

Temperature Rising Elution Fractionation (TREF) analysis is done using a CRYSTAF-TREF 200+ instrument from Polymer Char, S.A., Valencia, Spain. The principles of TREF analysis and a general description of the particular apparatus to be used are given in the article Monrabal, B.; del Hierro, P. Anal. Bioanal. Chem. 2011, 399, 1557. FIG. 3 of the article is an appropriate schematic of the particular apparatus to be used; however, the connections to the 6-port valve may differ from the apparatus to be used in that the tubing connected to the 11-o'clock port is connected to the 9-o'clock port and the tubing connected to the 9-o'clock port is connected to the 11-o'clock port. Pertinent details of the analysis method and features of the apparatus to be used are as follows.

1,2-Dichlorobenzene (ODCB) solvent stabilized with approximately 380 ppm of 2,6-bis(1,1-dimethylethyl)-4-methylphenol (butylated hydroxytoluene) is used for preparing the sample solution and for elution. The sample to be analyzed (approximately 25 mg but as low as approximately 10 mg) is dissolved in ODCB (25 ml metered at ambient temperature) by stirring at 150° C. for 60 min. A small volume (0.5 ml) of the solution is introduced into a column (15-cm long by ⅜" o.d.) packed with an inert support (of stainless steel balls) at 150° C., and the column temperature is stabilized at 140° C. for 45 min. The sample volume is then allowed to crystallize in the column by reducing the temperature to 30° C. at a cooling rate of 1° C./min. The column is kept at 30° C. for 15 min before injecting the ODCB flow (1 ml/min) into the column for 10 min to elute and measure the polymer that did not crystallize (soluble fraction). The infrared detector used (Polymer Char IR4) generates an absorbance signal that is proportional to the concentration of polymer in the eluting flow. A complete TREF curve is then generated by increasing the temperature of the column from 30 to 140° C. at a rate of 2° C./min while maintaining the ODCB flow at 1 ml/min to elute and measure the dissolving polymer.

In at least one embodiment, the polymer produced has an ethylene content of about 70 wt % or more, about 80 wt % or more, about 90 wt % or more and/or a density of about 0.910 or more, such as about 0.93 g/cc or more, about 0.935 g/cc or more, or about 0.938 g/cc or more. In some embodiments, the polymer produced has a density of 0.910 g/cc or more, alternately from 0.935 to 0.960 g/cc.

EXAMPLES

Figure 5:
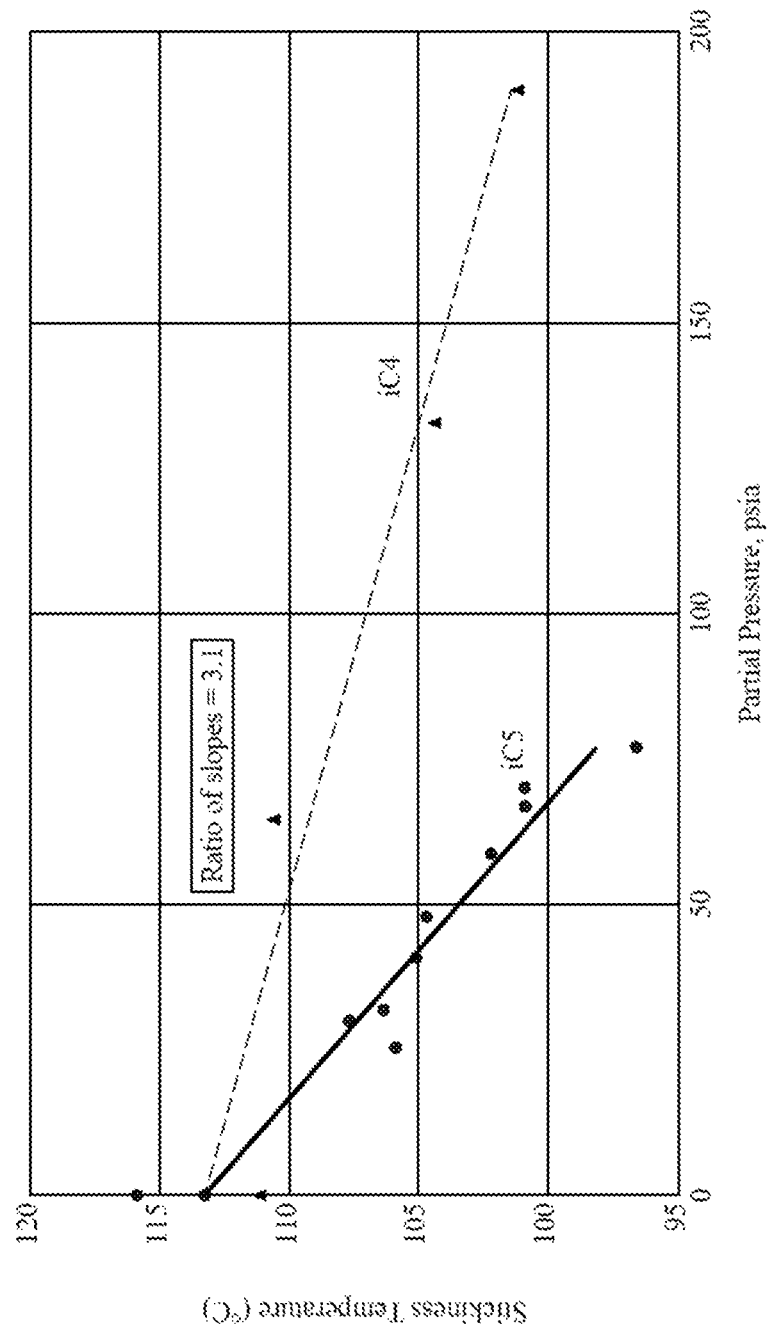
FIG. 5 is a graph of partial pressure of condensing agent versus stickiness temperature, according to one embodiment.

FIG. 5 is a graph illustrating an example linear regression used to calculate a single equivalence factor in production of polyethylene with a density of 0.918 g/cm³ and an $MI_{2.16}$ of 2 g/10 min. The stick limits for iC5 and iC4 were plotted on a chart where the y-axis is stickiness temperature and the x-axis is partial pressure of the CA. The linear regression of the points for each individual CA provided a line and the ratio of the slopes of those lines provided an equivalence factor for one set of reactor conditions. The data in FIG. 5 demonstrates that under these reactor conditions an equivalence factor for iC4 is 3.1 relative to iC5 by comparing the ratio of the slopes. The data in FIG. 5 were obtained by the laboratory method described in in U.S. Pat. No. 10,029,226.

Table 2 (shown in two parts; Tables 2.1 and 2.2) shows an example equivalence factor linear regression table of coefficients:

TABLE 2.1

|  | Intercept | Temperature | Pressure | MI | Density | C2= |
|---|---|---|---|---|---|---|
| iC4 | 7.489 | −7.55E−03 | 4.38E−04 | 2.24E−03 | −3.186 | −0.404 |
| nC4 | 6.623 | −2.88E−03 | 9.84E−05 | 2.39E−03 | −4.325 | −0.175 |
| C4= | 10.102 | −4.13E−03 | 1.92E−04 | 4.03E−03 | −7.691 | −0.218 |
| nC5 | 1.128 | 1.86E−04 | 5.88E−05 | 2.38E−04 | −0.400 | 0.004 |
| nC6 | −0.254 | 5.90E−04 | 6.59E−05 | −2.45E−04 | 0.501 | 0.024 |
| C6= | 0.083 | 5.79E−04 | 7.45E−05 | −7.67E−05 | 0.133 | 0.024 |
| Cis-2 C6= | −0.122 | 7.46E−04 | 5.14E−05 | −1.57E−04 | 0.332 | 0.021 |
| Trans-2 C6= | −0.231 | 8.27E−04 | 4.15E−05 | −2.18E−04 | 0.459 | 0.021 |

TABLE 2.2

|  | nC4 | iC4 | C4= | nC5 | iC5 | nC6 | C6= |
|---|---|---|---|---|---|---|---|
| iC4 | −0.729 | n/a | 0.279 | 0.268 | 1.35 | 4.039 | 3.283 |
| nC4 | n/a | −0.281 | 0.133 | 0.119 | 0.819 | 1.373 | 0.882 |
| C4= | −0.22 | −0.284 | n/a | 0.551 | 1.175 | 2.637 | 2.21 |
| nC5 | 0.006 | 0.019 | 0.098 | n/a | 0.278 | −0.217 | −0.278 |
| nC6 | 0.042 | 0.054 | 0.095 | −0.022 | 0.127 | n/a | −0.267 |
| C6= | 0.069 | 0.068 | 0.066 | 0.066 | 0.19 | −0.031 | n/a |
| Cis-2 C6= | 0.033 | 0.046 | 0.099 | −0.039 | 0.115 | −0.257 | −0.34 |
| Trans-2 C6= | 0.022 | 0.039 | 0.111 | −0.068 | 0.099 | −0.328 | −0.424 |

The combination of factors in the linear regression led to an equation to allowing calculation of the equivalence factor relating iC4 to iC5 of: $\alpha iC4 = 7.489 - 0.00755T + 0.000438P + 0.00224MI - 3.186\rho - 0.404X_{C2=} - 0.729 X_{nC4} + 0.279X_{C4=} + 0.268X_{nC5} + 1.350X_{iC5} + 4.039X_{nC6} + 3.283X_{C6=}$. Where T=Reactor Temperature (deg F.); P=Reactor Pressure (psia); MI=Resin Melt Index (g/10 min); ρ=Resin Density (g/cc); $X_{C2=}$=Mole Fraction of Ethylene in the Reactor Cycle Gas; $X_{nC4}$=Mole Fraction of n-Butane in the Reactor Cycle Gas; $X_{C4=}$=Mole Fraction of 1-Butene in the Reactor Cycle Gas; $X_{nC5}$=Mole Fraction of n-Pentane in the Reactor Cycle Gas; $X_{iC5}$=Mole Fraction of Isopentane in the Reactor Cycle Gas; $X_{nC6}$=Mole Fraction of n-Hexane in the Reactor Cycle Gas; and $X_{C6=}$=Mole Fraction of 1-Hexene in the Reactor Cycle Gas. In this example, the regression equation for the equivalence factors were developed by using the thermodynamic estimates from the method described above ([0122-0132]). The various variables in the linear regression were adjusted over wide ranges to allow the development of the described regression equation. The regression equation is suitable under the ranges of reactor conditions used to develop the model, but further extrapolation could result in inaccuracies.

Figure 6:
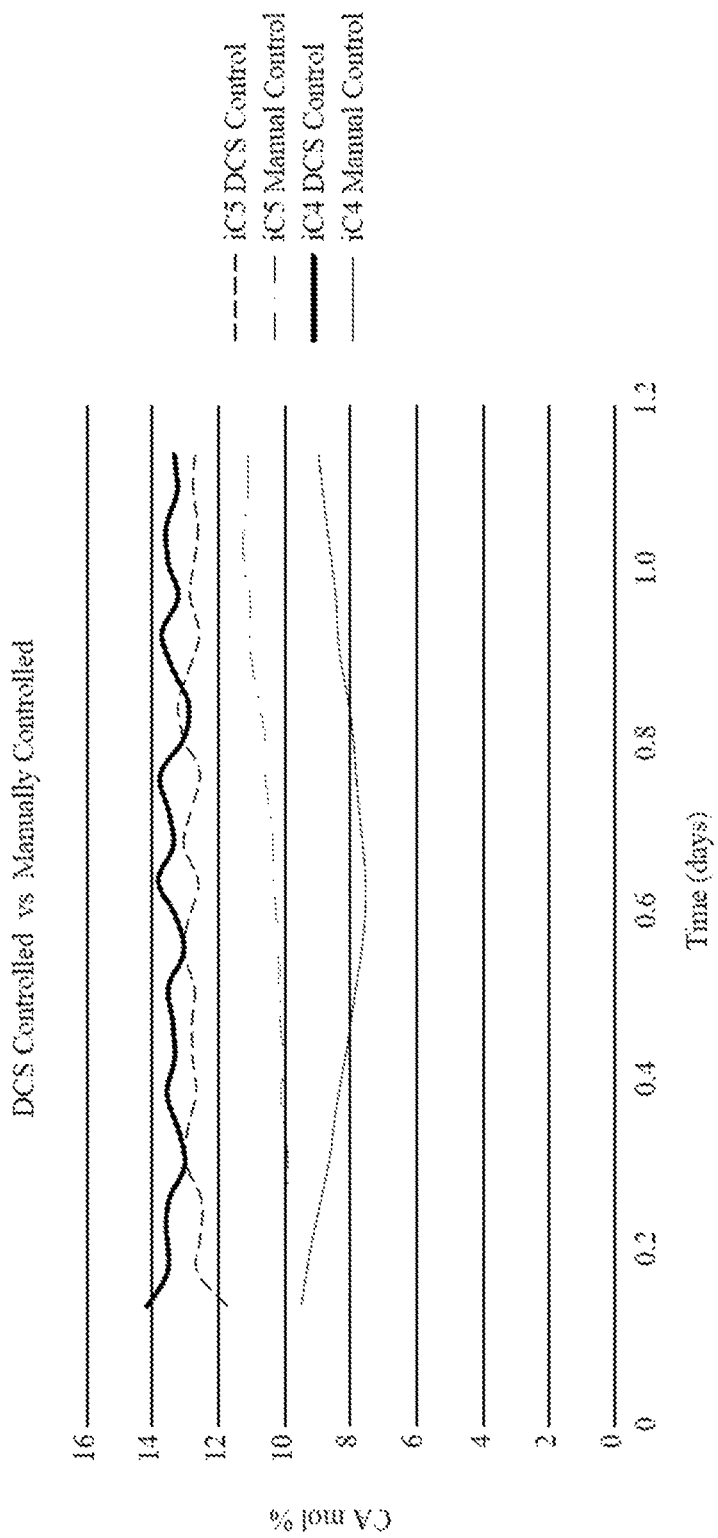
FIG. 6 is a graph of mole percentages of condensing agent over time in a reactor under conditions where the CA composition is automatically adjusted and conditions without automatic adjustment of the CA composition, according to one embodiment.

FIG. 6 is a graph of mole percentages of condensing agent over time with reactor conditions under DCS control and reactor conditions with manual control. Where a controlling system is used to calculate the correct ratio of CAs and automatically adjust as the reactor conditions change, the amounts of CAs can be increased, cooling improved, and therefore production rates increased.

Figure 7:
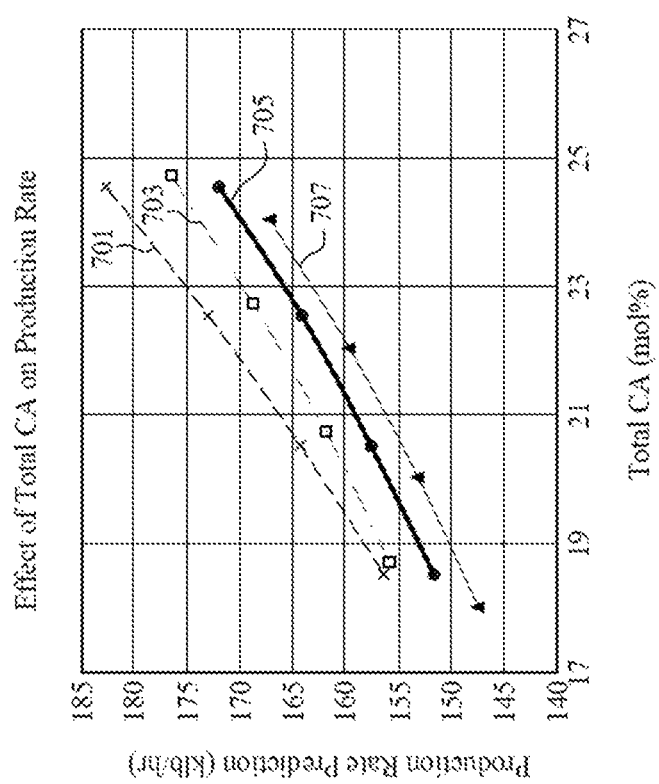
FIG. 7 is a graph of total condensing agent composition versus predicted production rate, according to one embodiment.

FIG. 7 is a graph of total condensing agent composition versus predicted production rate. As the total CA composition is increased, the overall production rate is increased. Line 701 shows an equivalence factor for iC5 and iC4 of 3.1, a total $SL_{iC5}$ of 16.5 mol %, with 1.0 mol % C6 inerts (static). Line 703 shows an equivalence factor for iC5 and iC4 of 2.4, a total $SL_{iC5}$ of 17 mol %, with 0.8 mol % C6 inerts (static). Line 705 shows an equivalence factor for iC5 and iC4 of 2.4, a total $SL_{iC5}$ of 16 mol %, with 1.0 mol % C6 inerts (static). Line 707 shows an equivalence factor for iC5 and iC4 of 2.4, a total $SL_{iC5}$ of 14.5 mol %, with 1.5 mol % C6 inerts (static). The total allowable CA (Z) is the x-axis and the y-axis is the predicted production rate.

Figure 8:
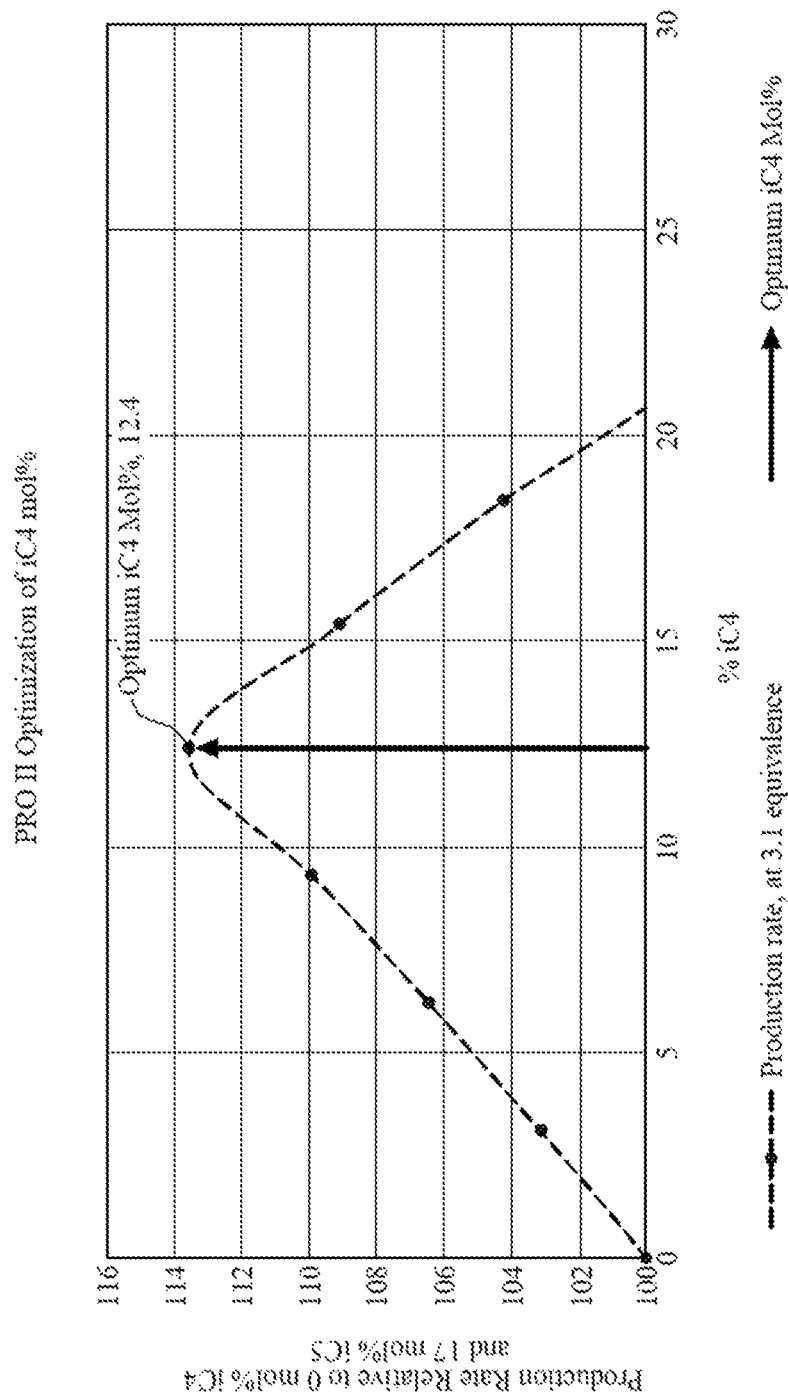
FIG. 8 is a graph illustrating data generated from commercial process engineering simulation software showing amount of iC5 removed and replaced by an amount of iC4 versus production rate relative to running a gas phase polymerization with only iC5, according to one embodiment.

FIG. 8 is a graph illustrating data generated from commercial process engineering simulation software showing amount of iC4 replacing removed iC5 versus production rate relative to running a gas phase polymerization with only iC5 for an LLDPE having a density of 0.918 gm/cc and an $MI_{2.16}$ of 1.0. PROII is a software package that allows for steady state simulation of process engineering. A polymerization system was modelled, and the production rate calculated for varying CA compositions, as iC4 was increased and iC5 decreased with an equivalence factor of 3.1. The plot of the simulated data gave a maximum production at approximately 12.4 mol % of iC4. The reaction conditions were set so that the reactor had a total allowable CA composition of 25.4%, the stick limit of iC5 was 17% and the equivalence factor was 3.1. Using equation E-14, it was found that 4 mol % of the iC5 may be replaced by 4×3.1 or 12.4 mol % of iC4, where the same maximum was obtained in a simple calculation rather than a simulation of 7 different iC4 amounts. For this simulation PRO/II software produced by SimSci™ was used.

Figure 9:
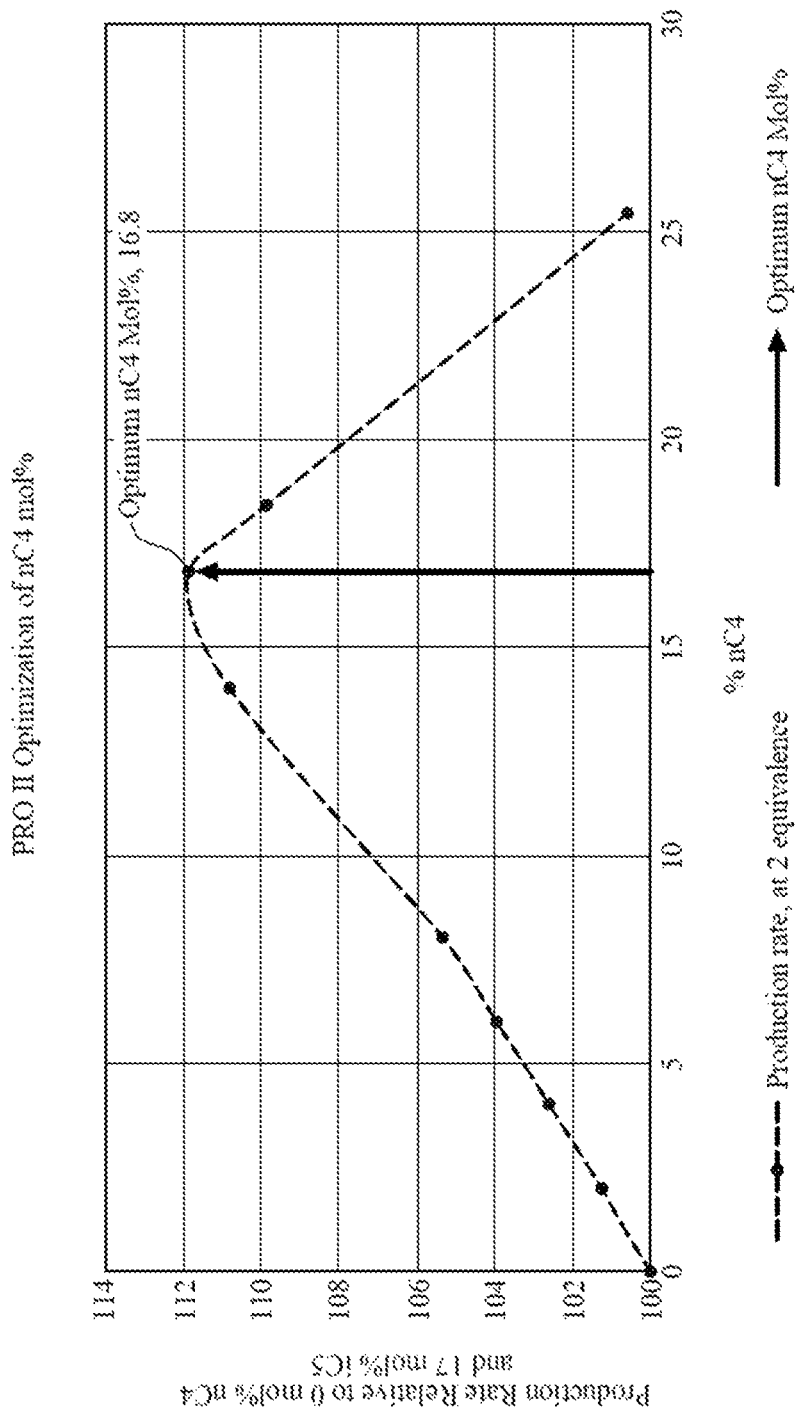
FIG. 9 is a graph illustrating data generated from commercial process engineering simulation software showing amount of iC5 removed and replaced by an amount nC4 versus production rate relative to running a gas phase polymerization with only iC5, according to one embodiment.

FIG. 9 is a graph illustrating data generated from commercial process engineering simulation software showing amount of nC4 replacing removed iC5 versus production rate relative to running a gas phase polymerization with only iC5 for an LLDPE having a density of 0.918 gm/cc and an $MI_{2.16}$ of 1.0. A polymerization system was modelled and the production rate calculated for varying CA compositions, as nC4 was increased and iC5 decreased with an equivalence factor of 2. The plot of the simulated data gave a maximum production at approximately 16.8 mol % of nC4. The reaction conditions were set so that the reactor had a total allowable CA composition of 25.4%, the stick limit of iC5 was 17% and the equivalence factor was 2. Using equation E-14, it was found that that 8.4 mol % of the iC5 may be replaced by 8.4×2 or 12.4 mol % of nC4, the same maximum was obtained in a simple calculation rather than a simulation of 9 different iC4 amounts. For this simulation PRO/II software produced by SimSci™ was used.

Figure 10:
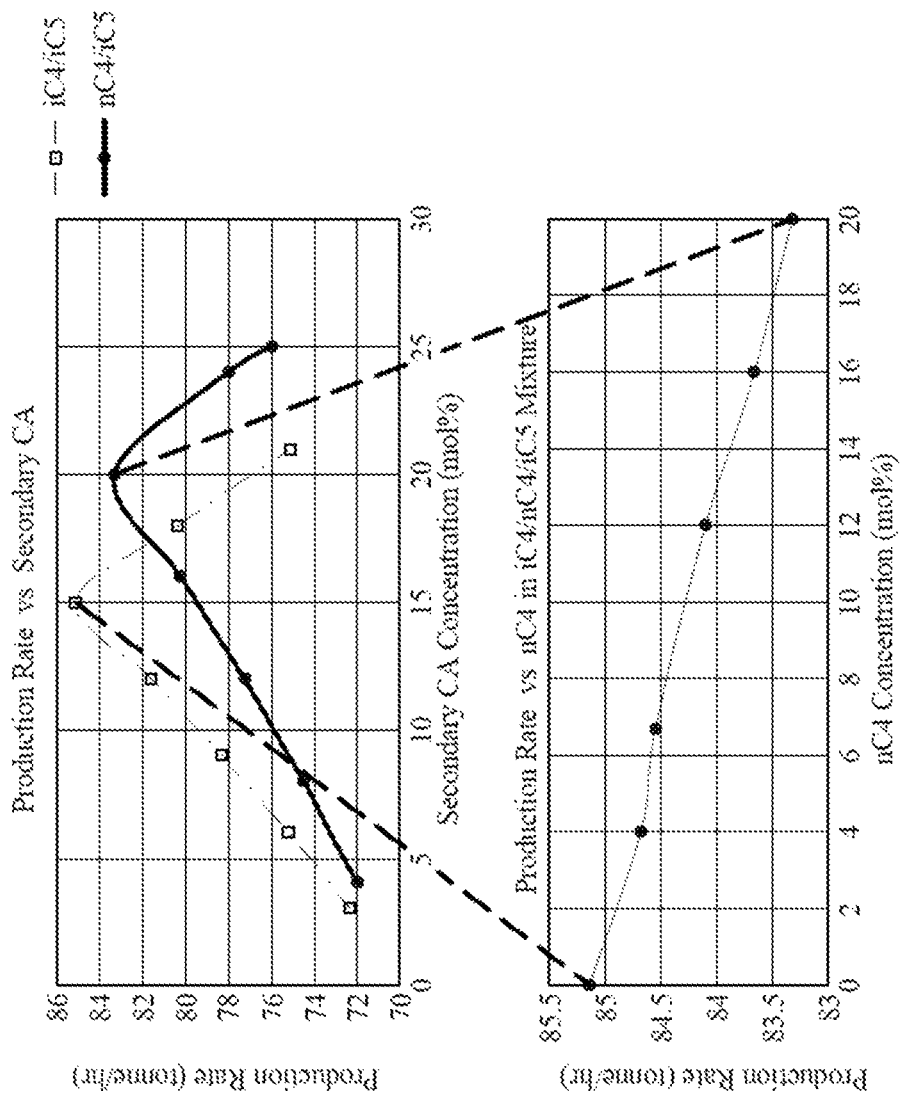
FIG. 10 is a graph illustrating production rates for two CA compositions containing two CAs, and the production rate of a CA composition containing three CAs, according to one embodiment.

FIG. 10 is a graph comparing production rate as a second CA replaces at least a portion of iC5 according to an equivalence factor relating the second CA with iC5 in a CA composition using a Z of 25 mol % and an $SL_{CA1}$ of 15 mol %. The secondary CAs were iC4 and nC4 with iC4 providing a greater overall production rate at approximately 85 tonnes/hour, where the nC4 composition had a maximum production rate above 83 tonnes/hour. In order to determine if a three component mixture provided added benefit, a ternary CA composition was tested where nC4 was increased in the iC5/iC4 mixture that provided production of approximately 85 tonnes/hour. The addition of nC4 to this mixture provided no additional benefit. As nC4 was increased, the production rate decreased.

Because binary CA compositions may provide the greatest production rate, the balance of CAs within a CA composition provides valuable cost benefit in the production of polyolefins in the gas phase.

Figure 11:
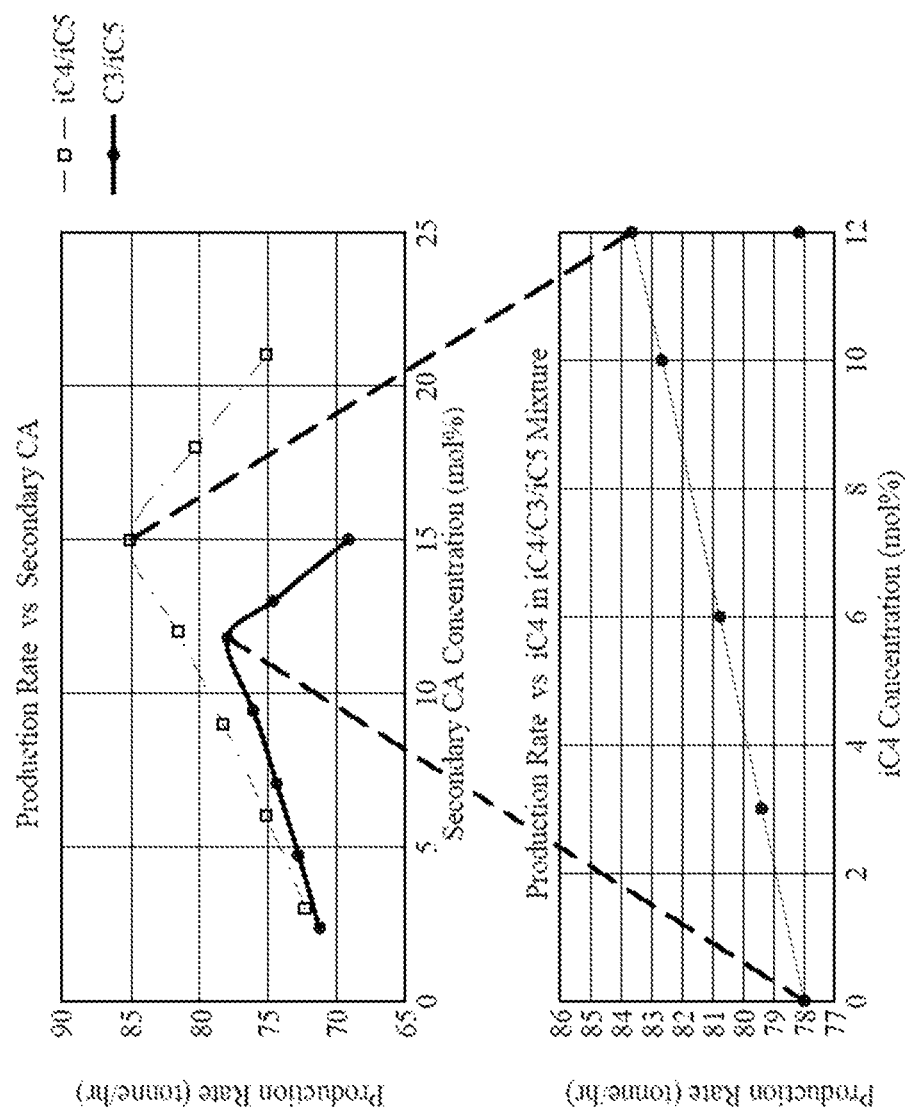
FIG. 11 is a graph illustrating production rates for two different CA compositions each containing two CAs, and the production rate of a CA composition containing three CAs, according to one embodiment.

FIG. 11 is a graph illustrating production rate as a second CA replaces at least a portion of iC5 according to an equivalence factor relating the second CA with iC5 in a CA composition using a Z of 25 mol % and an $SL_{CA1}$ of 15 mol %. The secondary CAs were iC4 and C3 with iC4 providing a greater overall production rate at approximately 85 tonnes/hour, where the C3 composition had a maximum production rate of about 77 tonnes/hour. In order to determine if a three component mixture provided added benefit, a ternary CA composition was tested where the amount of iC4 was increased in the iC5/C3 mixture that provided production of greater than 77 tonnes/hour. The addition of iC4 to this mixture improved the production rate, but not greater than the production rate of the CA composition containing only iC4 and iC5.

Figure 12:
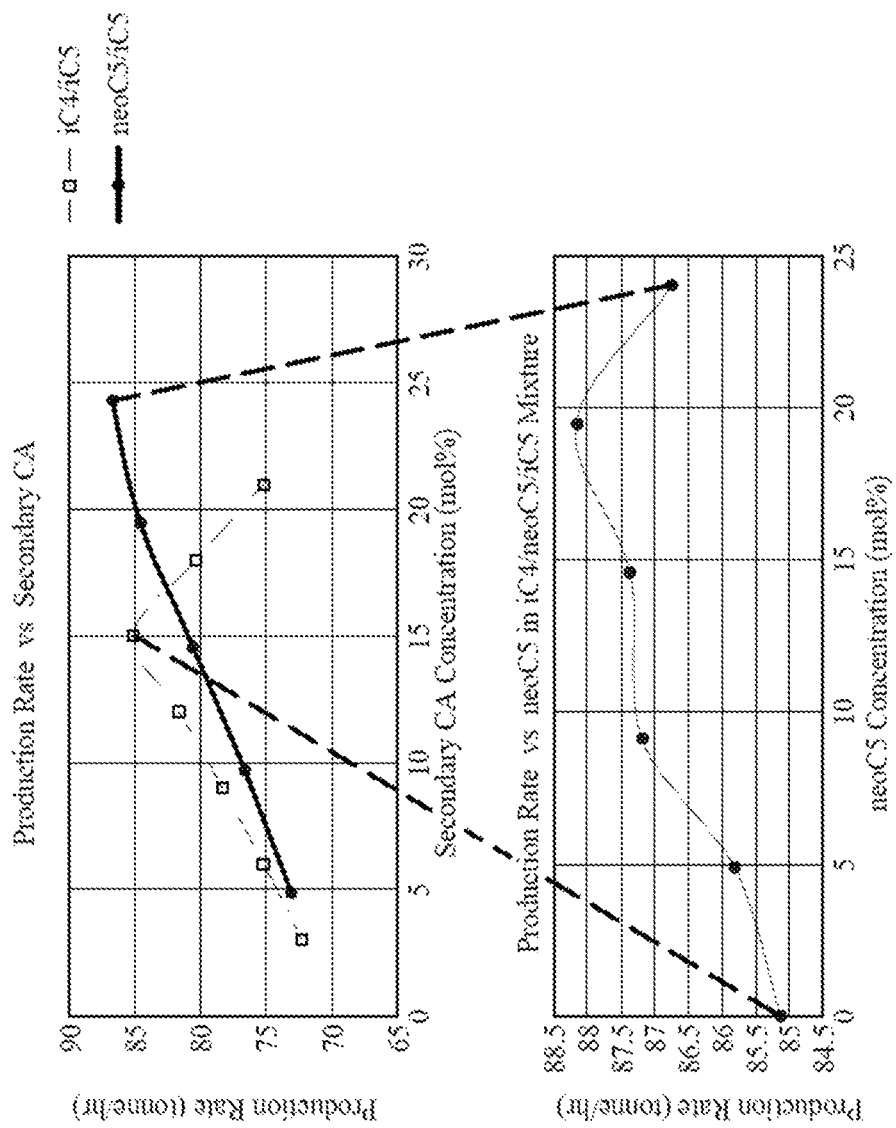
FIG. 12 is a graph illustrating production rates for two different CA compositions each containing two CAs, and the production rate of a CA composition containing three CAs, according to one embodiment.

FIG. 12 is a graph illustrating production rate as a second CA replaces at least a portion of iC5 according to an equivalence factor relating the second CA with iC5 in a CA composition using a Z of 25 mol % and an $SL_{CA1}$ of 15 mol %. The secondary CAs were iC4 and neoC5 with neoC5 providing a greater overall production rate at approximately 87 tonnes/hour, where the iC4 composition had a maximum production rate of approximately 85 tonnes/hour. In order to determine if a three component mixture provided added benefit, a ternary CA composition was tested where the amount of neoC5 was increased in the iC5/iC4 mixture. Because the stick limit was reached before the total allowable CA composition was reached in the binary neoC5/iC5 mixture, the ternary CA composition is shown to have greater production rates than the neoC5/iC5 peak. If the stick limit had not been reached before the total allowable CA composition, the binary CA composition would have had the greater production consistent with the results shown in FIGS. 10 and 11.

Figure 13:
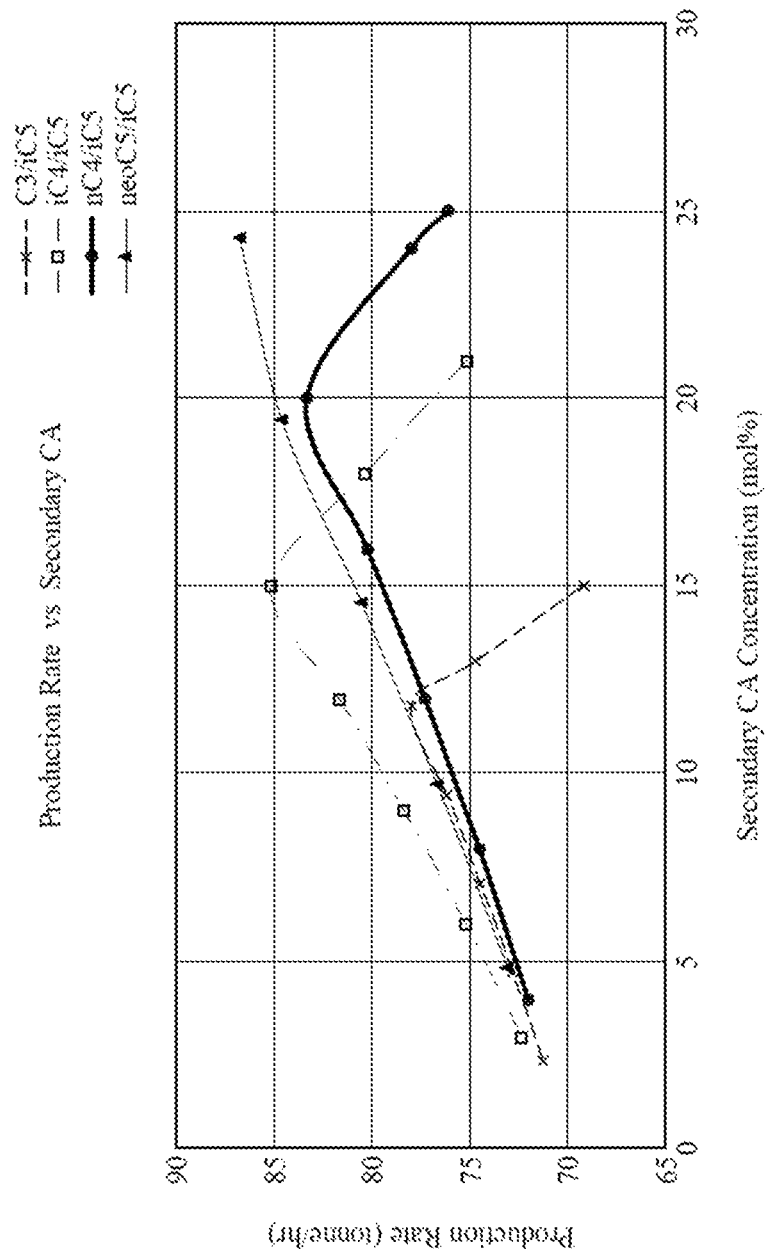
FIG. 13 is a graph illustrating production rates for four different CA compositions each containing two CAs.

FIG. 13 is a graph illustrating the polymer production rates of example binary CA compositions as a second CA replaces at least a portion of iC5 according to an equivalence factor relating the second CA with iC5. Under the reaction conditions of these tests, the neoC5 provided the greatest production rate improvement, but reached the stick limit before its inflection point. iC4 provided the next best production rate improvement. The binary CA compositions tested do not include all possible binary CA compositions, but include many typically used and evaluated compositions.

Figure 14:
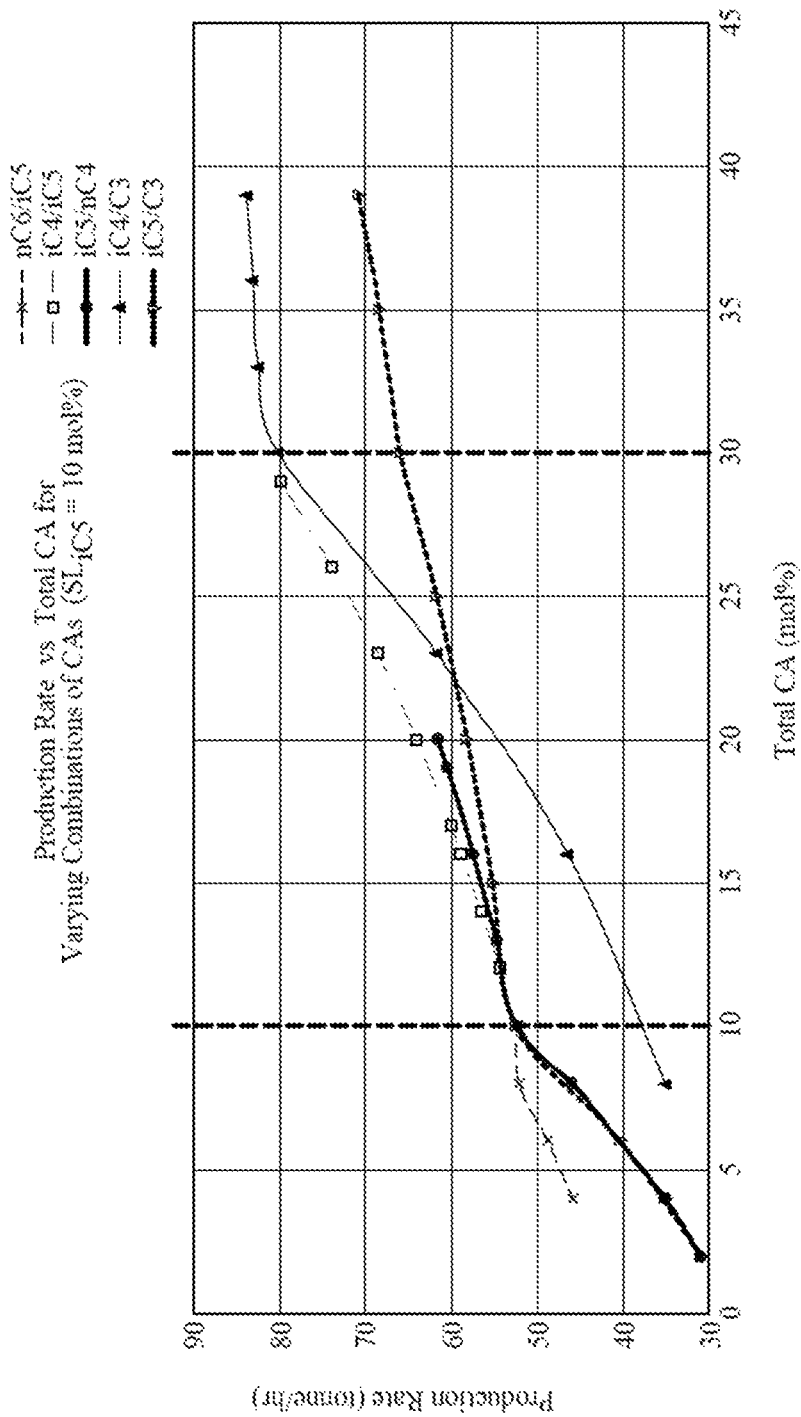
FIG. 14 is a graph illustrating production rates versus total mol % of CAs in the reactor for five different CA compositions each containing two CAs, according to one embodiment.
Figure 15:
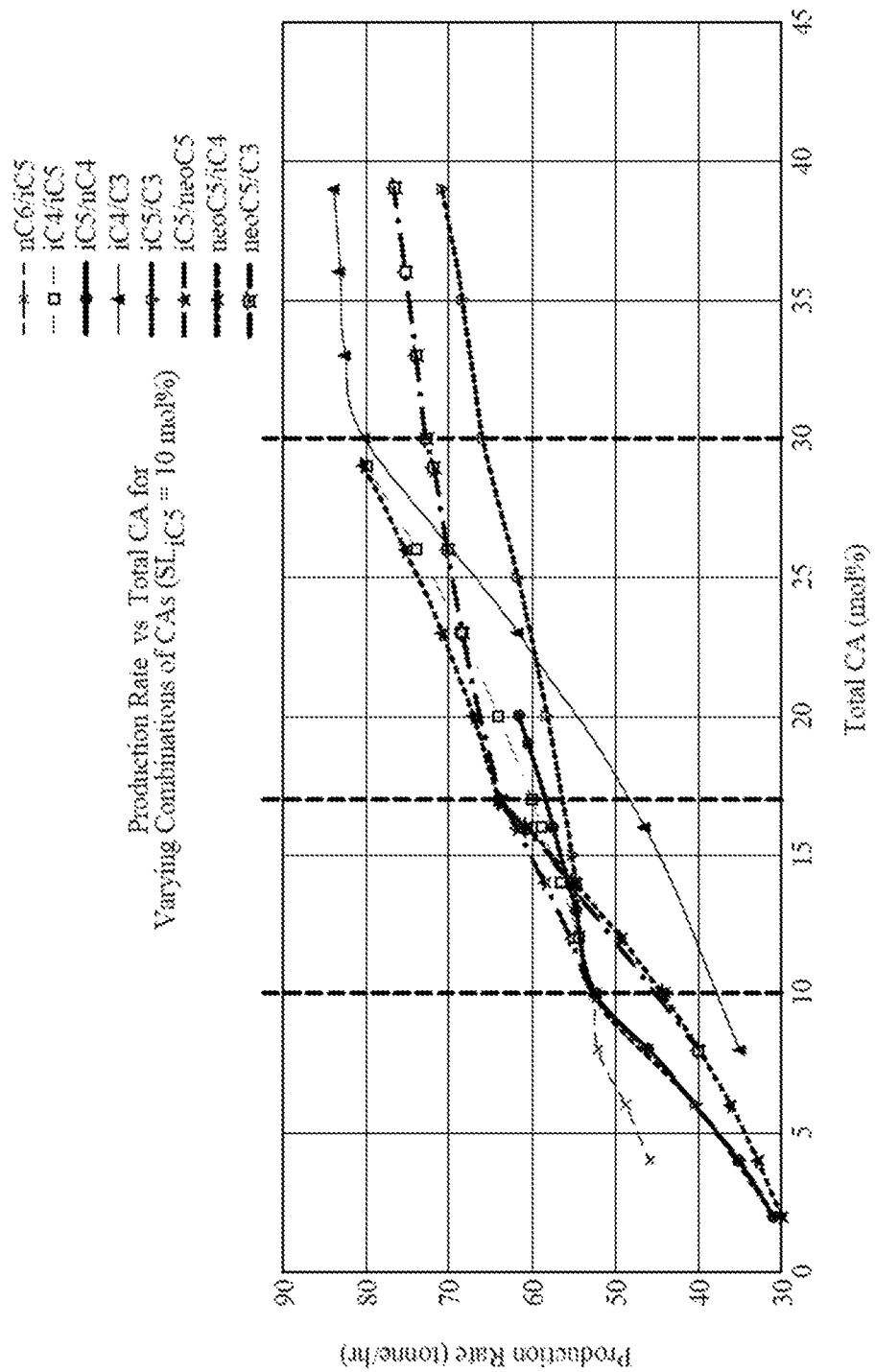
FIG. 15 is a graph illustrating production rates versus total mol % of CAs in the reactor for eight different CA compositions each containing two CAs, according to one embodiment.

FIG. 14 is a graph illustrating polymer production rate versus total CA for example binary CA compositions, where neoC5 is intentionally excluded because of lower availability. FIG. 14 demonstrates that where $SL_{iC5}$ is 10 mol % certain binary CA compositions provide improved production in certain ranges of total allowable CA. For example, if the total allowable CA is about 10 mol % or less, a CA composition including nC6 and iC5 can provide improved production. If the total allowable CA is from about 10 mol % to about 30 mol %, a CA composition including iC5 and iC4 can provide improved production. Lastly, if the total allowable CA is about 30 mol % or greater, a CA composition including iC4 and C3 can provide improved production. Without being limited by theory, the general trend observed is that beyond the stick limit of the more volatile component, a new binary CA composition provides improved production. If total allowable CA composition is greater than the stick limit of the more volatile component, improved rates may be achieved by using more volatile CA components, for example using the more volatile CA component of the binary CA composition from the previous stickiness region, combined with an even more volatile CA component. For example, since the stick limit of neoC5 in the neoC5/iC5 binary mixture was reached before the total allowable CA in FIG. 12, an improved production rate would be observed for a binary neoC5/iC4 mixture, even greater than the ternary neoC5/iC4/iC5 mixture. In this example, neoC5 would be the more volatile CA component from the previous stickiness region, and iC4 would be the more volatile component added. FIGS. 14 and 15 illustrate certain advantages of example binary CA compositions over other compositions.

FIG. 15 is a graph illustrating polymer production rate versus total CA for binary CA compositions, where neoC5 is included. As shown in FIG. 15, additional total CA composition may provide additional regions where the production is improved by changing the binary CA composition. Furthermore, where $SL_{iC5}$ is 10 mol %, certain binary CA compositions provide improved production in certain ranges of total allowable CA. For example, if the total allowable CA is about 10 mol % or less, a CA composition including nC6 and iC5 can provide improved production. Where the total allowable CA is from about 10 mol % to about 17 mol %, a CA composition including iC5 and neoC5 can provide improved production. Where the total allowable CA is from about 17 mol % to about 30 mol %, a CA composition including neoC5 and iC4 can provide improved production. Lastly, if the total allowable CA is about 30 mol % or greater, a CA composition including iC4 and C3 can provide improved production.

The regions in which a CA composition provides maximum production were calculated based on static equivalence factors. The boundaries of a particular region may be calculated by multiplying the stick limit of the first condensing agent by the equivalence factor of the second condensing agent in the binary CA composition providing the improved production rate. The CA composition providing improved production for a specific set of reactor conditions may change as reactor conditions change including production of varying grades of polyolefin allowing for different total allowable CA. The specific stickiness region boundaries can be calculated by multiplying the $SLCA_1$ term by the equivalence factor of the more volatile component in the combination of CAs with the greatest production rate.

FIGS. 10-15 demonstrate that, under these conditions, a CA composition containing two CAs is more effective than the corresponding ternary CA compositions. Without being limited by theory, the binary CA compositions with the greatest production rates are negatively affected by the addition of additional CAs, and provide improved production under certain reactor conditions over CA compositions containing three or more CAs.

Overall, it has been found that the ratios of CAs in a CA composition may be calculated using simplification of the many factors that affect solubility and stickiness in the produced polyolefin. The calculation allows for adjustments to the ratio of the CAs in a CA composition to take place in real time and allows for control of the adjustments by a control system processing reactor conditions and adjusting the CA composition accordingly. The calculation of, and adjustments made to, the CA composition may allow for increased production rates of polyolefin relative to previous processes.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A method to polymerize olefins with control of condensed phase cooling in a gas phase polymerization reactor, the method including:
    introducing one or more polymerization catalysts and one or more olefin monomers in into a gas phase polymerization reactor;
    introducing a condensing agent composition comprising a first condensing agent and a second condensing agent in a ratio of first condensing agent to second condensing agent, wherein the ratio of the first condensing agent to the second condensing agent is calculated by:
        ascertaining a stick limit for a first condensing agent,
        calculating an equivalence factor relating the first condensing agent and the second condensing agent,
        ascertaining a total allowable condensing agent composition, and
        calculating a first amount of the first condensing agent removed and replaced by a second amount of the second condensing agent;
    withdrawing a polyolefin product;
    withdrawing a gas phase composition comprising at least a portion of the first condensing agent and the second condensing agent;
    condensing a portion of the gas phase composition yielding a condensed stream; and
    recycling at least a portion of the condensed stream to the gas phase polymerization reactor.

2. The method of claim 1, wherein the calculating the first amount of the first condensing agent removed and replaced by the second amount of the second condensing agent is determined by using equation (E-14):

$$X = \frac{Z - SL_{CA1}}{\alpha CA2 - 1} \quad (E\text{-}14)$$

wherein X is the first amount of the first condensing agent removed and replaced by the second amount of the second condensing agent, the second amount is X multiplied by $\alpha CA2$, Z is the total allowable condensing agent, $SL_{CA1}$ is the stick limit for the first condensing agent, and $\alpha CA2$ is the equivalence factor relating the first condensing agent and the second condensing agent.

3. The method of claim 1, wherein the total allowable condensing agent composition is increased by one of the following:
    (i) decreasing partial pressure of nitrogen in the reactor;
    (ii) increasing reactor pressure; and
    (iii) decreasing partial pressure of inert gases other than nitrogen, the first condensing agent, and the second condensing agent.

4. The method of claim 1, wherein the first condensing agent and the second condensing agent are independently selected from C3-C6 hydrocarbons.

5. The method of claim 1, wherein the one or more olefin monomers comprises ethylene.

6. The method of claim 1, wherein the one or more olefin monomers comprises ethylene and a comonomer selected from propylene, 1-butene, 1-hexene, or 1-octene.

7. The method of claim 1, wherein the polyolefin product has a density of about 0.890 g/cm$^3$ to about 0.930 g/cm$^3$ and a g'$_{vis}$ of about 0.97 or greater.

8. The method of claim 1, wherein the first condensing agent and the second condensing agent are one of the following pairs:
    (a) the first condensing agent is isopentane and the second condensing agent is isobutane;
    (b) the first condensing agent is isobutane and the second condensing agent is n-butane;
    (c) the first condensing agent is n-hexane and the second condensing agent is iso-pentane;
    (d) the first condensing agent is isobutane and the second condensing agent is propane;
    (e) the first condensing agent is isopentane and the second condensing agent is neo-pentane;
    (f) the first condensing agent is neo-pentane and the second condensing agent is isobutane.

9. The method of claim 1, wherein determining the stick limit is performed using a thermodynamic estimation of hydrocarbon solubility.

10. The method of claim 1, wherein determining the stick limit is performed by a laboratory stickiness temperature test.

11. The method of claim 1, wherein determining the equivalence factor relating the first condensing agent and the second condensing agent is performed using thermodynamic estimation as a function of pressure, temperature, melt index, gas composition, and density.

12. The method of claim 1, wherein determining the equivalence factor relating the first condensing agent and the second condensing agent is performed by calculating a ratio of stickiness temperature versus partial pressure slopes of the first condensing agent and the second condensing agent.

13. The method of claim 1, wherein determining the equivalence factor relating the first condensing agent and the second condensing agent is performed by entering data into an equation relating the equivalence factor to reactor conditions.

14. The method of claim 1, further comprising adjusting the ratio of first condensing agent to second condensing agent as reactor conditions change with a control system.

15. The method of claim 14, wherein the control system comprises a distributed control system (DCS)-DES control.

16. The method of claim 1, wherein the condensing agent composition consists of the first condensing agent and the second condensing agent.

17. The method of claim 1, wherein the gas phase composition is free of condensing agents other than the first condensing agent and the second condensing agent.

18. The method of claim 1, wherein the recycling the at least a portion of the condensed stream to the gas phase polymerization reactor further comprises adding one or more of the first condensing agent or the second condensing agent to the condensed stream.

* * * * *